(12) United States Patent
Eguchi et al.

(10) Patent No.: US 8,214,062 B2
(45) Date of Patent: *Jul. 3, 2012

(54) PLANT CONTROL SYSTEM AND THERMAL POWER GENERATION PLANT CONTROL SYSTEM

(75) Inventors: Toru Eguchi, Mito (JP); Akihiro Yamada, Tokai (JP); Naohiro Kusumi, Hitachinaka (JP); Takaaki Sekiai, Hitachi (JP); Masayuki Fukai, Hitachi (JP); Satoru Shimizu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 571 days.

This patent is subject to a terminal disclaimer.

(21) Appl. No.: 12/366,996

(22) Filed: Feb. 6, 2009

(65) Prior Publication Data

US 2009/0248175 A1 Oct. 1, 2009

(30) Foreign Application Priority Data

Mar. 28, 2008 (JP) ................................. 2008-087400

(51) Int. Cl.
*G05B 13/02* (2006.01)

(52) U.S. Cl. ............... 700/30; 700/34; 700/47; 700/286

(58) Field of Classification Search ............... 700/29–34, 700/38–39, 47, 50, 83, 108, 286, 287, 289
See application file for complete search history.

(56) References Cited

U.S. PATENT DOCUMENTS

| | | | | |
|---|---|---|---|---|
| 5,305,230 A | * | 4/1994 | Matsumoto et al. ........ | 700/287 |
| 6,529,887 B1 | | 3/2003 | Doya et al. | |
| 7,206,644 B2 | * | 4/2007 | Iino et al. ........ | 700/36 |
| 7,660,639 B2 | | 2/2010 | Yamada et al. | |
| 2007/0203862 A1 | | 8/2007 | Sekiai et al. | |
| 2007/0234781 A1 | * | 10/2007 | Yamada et al. ........ | 73/23.2 |
| 2007/0240648 A1 | * | 10/2007 | Badami et al. ........ | 122/504 |
| 2008/0306890 A1 | | 12/2008 | Eguchi et al. | |

FOREIGN PATENT DOCUMENTS

JP 5-224600 A 9/1993

(Continued)

OTHER PUBLICATIONS

Yamashina, Ryota et al, "Advance Motion Acquisition of an Actual Root by Reinforcement Learning Using Reward Change", Transactions of Japan Society of Mechanical Engineers, vol. 72, No. 717, 2006, pp. 1574-1581 (w. English translation).

(Continued)

*Primary Examiner* — Kakali Chaki
*Assistant Examiner* — Nathan Laughlin
(74) *Attorney, Agent, or Firm* — Mattingly & Malur, PC

(57) ABSTRACT

The plant control system has a measurement signal data database, a model to estimate the value of measurement signal data used at a time when an operation signal is given to the plant, and an operation signal learning unit to learn a method of generating a model input, which is equivalent to an operation signal, so that a model output, which is equivalent to the measurement signal data, attains a target value. The plant control system also has an evaluation function calculating unit to calculate an evaluation function value from the model output obtained as a result of an operation carried out by the operation signal learning unit for the model, and an evaluation function adjusting unit to adjust evaluation function parameters used in calculation of an evaluation function.

14 Claims, 14 Drawing Sheets

FOREIGN PATENT DOCUMENTS

| | | |
|---|---|---|
| JP | 9-231241 A | 9/1997 |
| JP | 10-267357 A | 10/1998 |
| JP | 2000-035956 | 2/2000 |
| JP | 2000-112915 A | 4/2000 |
| JP | 2002-189502 | 7/2002 |
| JP | 2007-233634 | 9/2007 |
| JP | 2007-241624 | 9/2007 |
| JP | 2007241624 A * | 9/2007 |
| JP | 2007-264796 | 10/2007 |
| JP | 2007-265212 A | 10/2007 |
| JP | 2007-271187 A | 10/2007 |
| JP | 2007-272361 | 10/2007 |
| JP | 2007-272498 | 10/2007 |
| JP | 2007-272646 | 10/2007 |

OTHER PUBLICATIONS

U.S. Appl. No. 12/274,659, filed Nov. 2008.

* cited by examiner

FIG. 6

| | MEASUREMENT DATA k | | | PARAMETER VALUE | | | |
|---|---|---|---|---|---|---|---|
| | M1 | M2 | | LEARNING COUNT l | 1 | 2 | ......... |
| S1 | m11 | m12 | ......... | PARAMETER a | a11 | a12 | ......... |
| | | | | PARAMETER b | b11 | b12 | ......... |
| S2 | m21 | m22 | ......... | PARAMETER a | a21 | a22 | ......... |
| | | | | PARAMETER b | b21 | b22 | ......... |
| S3 | m31 | m32 | ......... | PARAMETER a | a31 | a32 | ......... |
| | | | | PARAMETER b | b31 | b32 | ......... |
| ⋮ | ⋮ | ⋮ | ⋮ | ⋮ | ⋮ | ⋮ | ⋮ |
| Sj | mj1 | mj2 | ......... | PARAMETER a | aj1 | aj2 | ......... |
| | | | | PARAMETER b | bj1 | bj2 | ......... |
| ⋮ | ⋮ | ⋮ | ⋮ | ⋮ | ⋮ | ⋮ | ⋮ |

1) WHEN $f_{c1} \le b$

2) WHEN $f_{c1} > b$ AND $E_{c1} \ge \delta$

3) WHEN $f_{c1} > b$, $E_{c1} < \delta$

FIG. 15

LEARNING CONDITION SETTING　☒

MAXIMUM LEARNING COUNT ▭ ~3040

MAXIMUM OPERATION COUNT ▭ ~3041

CONTROL ENSURING VALUE/
WEIGHT COEFFICIENT SETTING

| MODEL OUTPUT | CONTROL ASSURANCE | CONTROL ASSURANCE VALUE | WEIGHT COEFFICIENT |
|---|---|---|---|
| $NO_x$ CONCENTRATION | ☐ | — | 5 |
| CO CONCENTRATION | ☑ | 100 | — |
| $H_2S$ CONCENTRATION | ☐ | — | 1 |

↘3042　↘3043　↘3044　↘3045

TO REFERENCE SETTING HISTORY ▭ ~3046

[REFERENCE] ~3047

[ADVANCE] ~3048　[RETURN] ~3049

PLANT CONTROL SYSTEM AND THERMAL POWER GENERATION PLANT CONTROL SYSTEM

CLAIM OF PRIORITY

The present application claims priority from Japanese patent application serial No. 2008-087400, filed on Mar. 28, 2008, the content of which is hereby incorporated by reference into this application.

FIELD OF THE INVENTION

The present invention relates to a plant control system and, more particularly, to a control system for a thermal power generation plant that uses a fossil fuel such as coal.

BACKGROUND OF THE INVENTION

A plant control system processes the measurement signal data obtained from a plant, which is a control target, calculates the operation signals to be given to the plant, and transmits the calculated operation signals. The plant control system includes an algorithm for calculating the operation signals so that the measurement signal data from the plant satisfies their target values.

Control algorithms used for plant control include a proportional integration (PI) control algorithm. In PI control, a deviation between the measurement signal data obtained from the plant and its target value is multiplied by a proportional gain, and a value obtained by integrating the deviation with time is added to the value obtained by the multiplication, so as to derive an operation signal to be given to the control target.

In the control algorithm in which PI control is used, relationships between inputs and outputs can be represented by using block diagrams, clarifying the cause-and-effect relations between them. Therefore, this type of control algorithm has been widely applied. However, a plant may be operated under a condition which is not scheduled in advance when, for example, the method of operating the plant is changed or the environment around the plant is changed. When this happens, tasks such as changing the control logic may be needed.

Adaptive control is available in which the control algorithm or parameter values are automatically corrected according to the changes in the plant operation method and environment. Control methods using a learning algorithm are also available. Patent Document 1 describes a technology concerning a control system that uses a reinforcement learning theory as a method of deriving operation signals for a control system that uses a learning algorithm to control a plant. In this method, the control system has a model for predicting characteristics of its control target and a learning part for learning a method of operating a model input so that a model output attains its target value. Since the model input learnt in the learning part is input to the model, the effect of bringing the model output to its target value is obtained.

Since, in this learning type of adaptive control, an operation method by which the model output attains its target value is learnt, an evaluation function value, which represents an attainment degree of the target value, is calculated according to the value of the model output obtained as a result of an operation; the learning part learns an operation method by using the evaluation function value as an index.

When a learning control system is constructed, the design of this type of evaluation function is generally entrusted to a system designer. The system designer must design an appropriate evaluation function in view of control specifications such as a control target value and a learning time as well as the characteristics of the control target.

Patent Document 2 discloses a control unit, based on reinforcement learning, which is robust to environmental changes because evaluation signal data is defined by giving a consideration for a disturbance of a control system, which is generated by a disturbance generator, to an ordinary compensation signal depending on the attainment degree of the target, and learning is carried out so that its expected value is maximized.

Non-patent Document 1 describes a technology concerning the design of an evaluation function appropriate to a learning control system; an evaluation function (compensation) designed so that a desirable behavior is obtained is given to a learning mechanism based on the reinforcement learning theory, according to the progress of learning, enabling efficient learning.

Patent Document 1: Japanese Patent Laid-open No. 2000-35956
Patent Document 2: Japanese Patent Laid-open No. 2002-189502
Non-patent Document 1: Yamanashi, Motoyama, Urakawa, Oh, Yabuta, "Advance Motion Acquisition of an Actual Robot by Reinforcement Learning using Reward Change", Transactions of the Japan Society of Mechanical Engineers (C), Vol. 72, No. 717, pp. 1574-1581, 2006.

SUMMARY OF THE INVENTION

When the technology described in Patent Document 1 or 2 or Non-patent Document 1 is applied to a control system of a plant, a method of generating a plant operation signal for achieving a control target is automatically learnt.

If, however, knowledge about the plant is insufficient or its characteristics are not fully understood, an evaluation function for satisfying the control specifications cannot be designed and thereby a desirable operation method may not be learnt. Another case in which a desirable operation method may not be learnt occurs when the plant characteristics change with time due to, for example, a change in the plant operation conditions or deterioration from aging. The evaluation function cannot be redesigned immediately in response to a change in required control specifications. This may also prevent the learning of a desirable operation method.

The present invention addresses the above problems in the prior art with the object of providing a plant control system that automatically generates an appropriate evaluation function to enable learning of an operation method by which a control target value is attained even when the characteristics of a plant, which is a control target, are unknown or when the plant characteristics or control specifications are changed.

A plant control system according to one aspect of the present invention has a measurement signal data database in which to save previous measurement signal data, a model to estimate a value of measurement signal data used at a time when an operation signal is given to a plant, an operation signal learning unit to learn a method of generating a model input, which is equivalent to an operation signal, so that a model output, which is equivalent to the measurement signal data, attains a target value in the model, an evaluation function calculating unit to calculate an evaluation function value, which indicates an attainment degree of the target value, from the model output obtained as a result of an operation carried out by the operation signal learning unit for the model, and a learning information database in which to save information about records of evaluation function values obtained by the operation signal learning unit and learning and information about model output learning records; the plant control system uses the measurement signal data obtained from the plant to calculate the operation signal for operating the plant and sends the calculated operation signal to the plant; setting condition information used for evaluation function adjustment is input from the learning information database; evaluation function parameters used by the evaluation function calculating unit in evaluation function calculation are adjusted; and an evaluation function adjusting unit is provided, in which to save information about adjustment results including evaluation function parameter adjustment records.

According to a desirable aspect of the present invention, an evaluation function suitable to the characteristics of a control target is calculated by adjusting the evaluation function parameters according to an evaluation function value and a model output obtained by operating a model that simulates the characteristics of a plant for which learning is performed. Accordingly, a desirable operation method can be always learnt even when the characteristics of the plant are unknown or when plant characteristics are changed due to operation condition changes or changes in control specifications.

Other objects and features of the present invention will be clarified in the embodiments described below.

BRIEF DESCRIPTION OF THE DRAWINGS

FIG. 6 shows a form of information saved in a learning information database in the plant control system in the first embodiment of the present invention.

FIG. 15 shows an exemplary screen displayed on the display when learning is executed in the plant control system in a second embodiment of the present invention.

DESCRIPTION OF THE PREFERRED EMBODIMENTS

Figure 1:
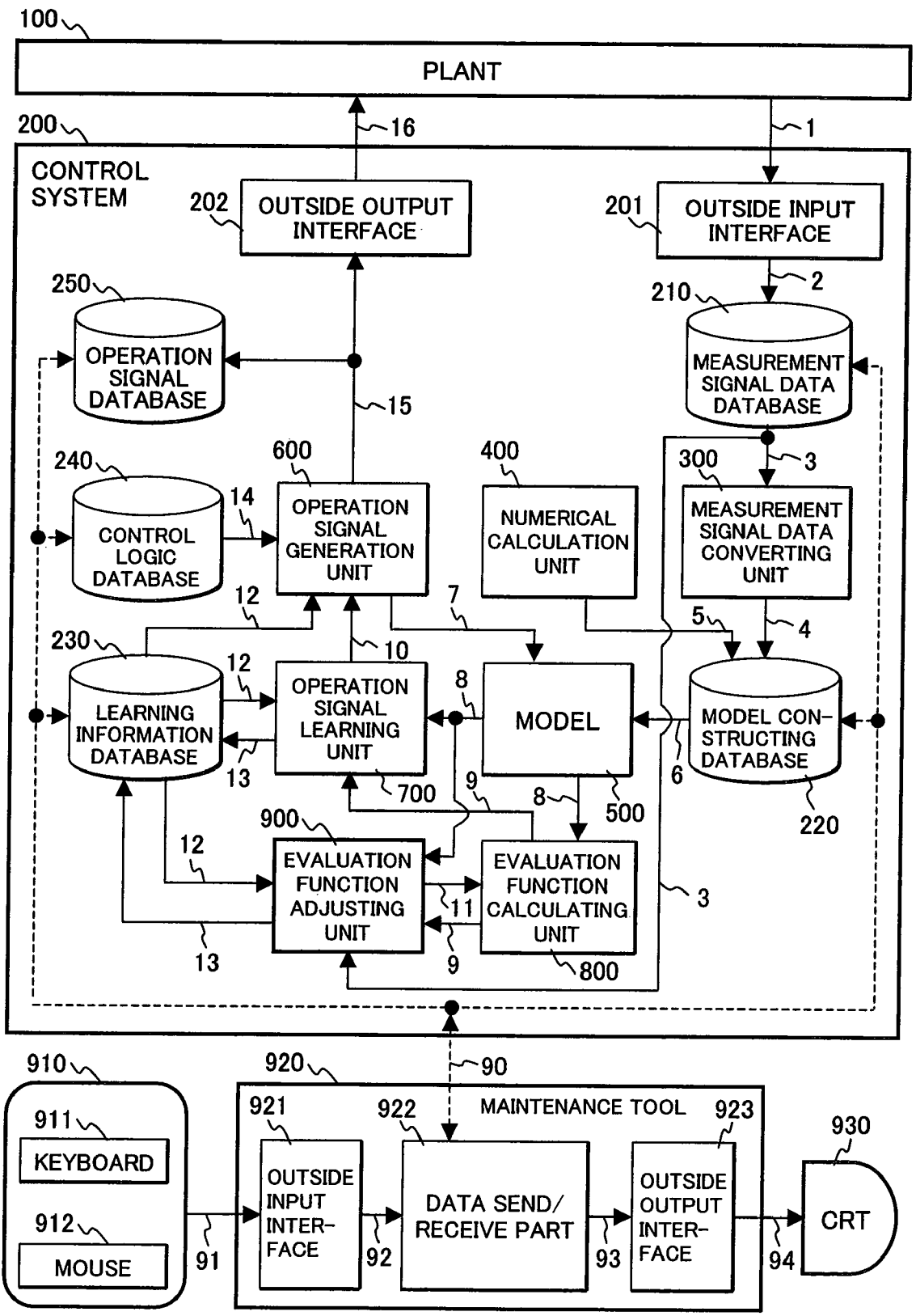
FIG. 1 is a block diagram showing the structure of a plant control system in a first embodiment of the present invention.

The evaluation function calculating unit in the control system in the present invention should have at least one of a parameter for determining an expected value of an evaluation function value and a parameter used as a threshold value to obtain an optimum value of the evaluation function. The evaluation function calculating unit also has a feature to calculate the evaluation function value from a model output obtained as a result of an operation performed by the operation signal learning unit for the model or from a reference model output, which is the weighted sum of a plurality of model outputs.

The evaluation function adjusting unit should have at least one of a feature to calculate a similarity of degree through a calculation of the distance between measurement signal data for a plant associated with an adjustment record of a previous evaluation function parameter and measurement signal data for the plant for which an operation method is learnt, a feature to adjust the evaluation function parameter according to an adjustment record by which a calculated similarity of degree equal to or smaller than a threshold value given in advance is minimized (the most similarity is provided), and a feature to adjust the evaluation function parameter according to output information about the model, which is obtained during learning, and evaluation function value information.

When a previous adjustment record of evaluation function parameters is used, an adjustment record of execution in an operation state that is most similar to the current plant operation state is selected. Accordingly, the calculation cost required for adjustment can be eliminated and a risk of unsuccessful learning can be reduced. Even in an unexperienced operation state, model output information obtained during learning is autonomously used to adjust the parameter according to the operation state during the learning, enabling a desired operation method to be learnt.

The evaluation function adjusting unit should have at least one of a feature to increase or decrease the value of the parameter that determines an expected value of the evaluation function value during the evaluation function parameter adjustment based on the model output information, depending on whether an evaluation function value calculated from the reference model output is equal to or greater than a threshold value given in advance, and a feature to increase or decrease the parameter value depending on whether the reference model output is equal to or smaller than the parameter, which is a threshold value for obtaining an optimum value of the evaluation function.

The evaluation function adjusting unit should have at least one of a feature to set a threshold value to a value that is substantially fixed through learning, the threshold value being used to adjust the parameter that determines an expected value of the evaluation function value, a feature to set the threshold value to a small value in an initial state of the learning and linearly increasing the threshold value as the learning proceeds, and a feature to set the threshold value to a small value in the initial state of the learning and non-linearly increasing the threshold value as the learning proceeds.

The control system in the present invention can include at least one of a feature to display, on a screen, information saved in a measurement signal data database and information saved in a learning information database, a feature to set a learning condition used in the operation signal learning unit through a display feature, a feature to set an adjustment condition used in the evaluation function adjusting unit through the display feature, and a feature to display, on another screen, a rough sketch of the evaluation function and a record of learning results of model output values during operation method learning.

Since the features to input adjustment condition settings for learning and the evaluation function parameter through the display are provided, a plant operator can appropriately set a control target value and adjustment conditions according to the plant control needs. The plant operator can also appropriately set measurement signal data items used in calculating the similarity of degree of record data according to the operation situation. Since the feature to display, on the display, the rough sketch of the evaluation function, the evaluation function value, the and model output value during learning are provided, the plant operator can check whether a desired operation method has been learnt and determine whether to complete the learning before a maximum learning count, which is set in advance, is reached.

A thermal power generation plant control system according to another aspect of the present invention has an operation signal generation part that uses measurement signal data obtained from a thermal power generation plant to derive a plurality of operation signals to be supplied to the thermal power generation plant; the measurement signal data includes at least one of the concentrations of nitrogen oxide, carbon monoxide, and hydrogen sulfide included in gas emitted from the thermal power generation plant; the plurality of operation signals determine at least one of the opening of an air damper, an air flow rate, a fuel flow rate, and an exhaust gas recycle flow rate; the control system comprises a measurement signal data database in which to save previous measurement signal data, a model to estimate the value of measurement signal data used at a time when an operation signal is given to the thermal power generation plant, an operation signal learning unit to learn a method of generating a model input, which is equivalent to an operation signal, so that a model output, which is equivalent to the measurement signal data, attains a target value in the model, the target value being set through a display, an evaluation function calculating unit to calculate an evaluation function value, which indicates an attainment degree of the target value, from the model output, which indicates a result of an operation carried out by the operation signal learning unit for the model, a learning information database in which to save information about records of evaluation function values obtained by the operation signal learning unit and learning and information about model output learning records, and an evaluation function adjusting unit to receive setting condition information used for evaluation function adjustment from the learning information database, adjust an evaluation function parameter used for evaluation function calculation in the evaluation function calculating unit, and save information about an adjustment result including an evaluation function parameter adjustment record.

The thermal power generation plant control system can include at least one of a feature to display, on a display, information saved in a measurement signal data database and information saved in a learning information database, a feature to set a learning condition used in the operation signal learning unit through a display feature, a feature to set an adjustment condition used in the evaluation function adjusting unit through the display feature, and a feature to display, on the display, a rough sketch of the evaluation function and a record of learning results of model output values during operation method learning.

In an embodiment in which the present invention is applied to a thermal power generation plant, inputs supplied through the display are weight coefficients used in evaluation function calculation or control ensuring values related to the concentrations of nitrogen oxide, carbon monoxide, and hydrogen sulfide, which are equivalent to model outputs in the thermal power generation plant. When an evaluation function adjustment condition is set, a load ratio, a coal type, a feedwater flow rate, a gas temperature, and other measurement data can be selected through the display so as to calculate the degree of similarity.

Next, the plant control system in an embodiment of the present invention, will be described with reference to the drawings.

First Embodiment

FIG. 1 is a block diagram of a plant control system in a first embodiment of the present invention. The plant 100 in FIG. 1 is structured so that it is controlled by a control system 200.

The control system 200, which controls the plant 100 as a control target, includes various types of calculation units, which are a measurement signal data converting unit 300, a numerical calculation unit 400, a model 500, an operation signal generation unit 600, an operation signal learning unit 700, an evaluation function calculating unit 800, and an evaluation function adjusting unit 900.

The control system 200 also includes various types of databases, which are a measurement signal data database 210, a model construction database 220, a learning information database 230, a control logic database 240, and an operation signal database 250.

The control system 200 also includes interfaces to the outside, which are an outside input interface 201 and an outside output interface 202.

The control system 200 receives measurement signal data 1 from the plant 100 through the outside input interface 201. The control system 200 sends an operation signal 16 to the plant 100, which is the control target, through the outside output interface 202.

The control system 200 saves measurement signal data 2, which has been received as the measurement signal data 1 from the plant 100 through the outside input interface 201, in the measurement signal data database 210. An operation signal 15, which is generated by the operation signal generation unit 600, is sent to the outside output interface 202 and also saved in the operation signal database 250.

The measurement signal data converting unit 300 converts measurement signal data 3, which has been saved in the measurement signal data database 210, to model constructing data 4, and saves the converted data in the model constructing database 220. An operation condition obtained as a result of the last operation and included in the measurement signal data 3 is input to the evaluation function adjusting unit 900.

The numerical calculation unit 400 internally has a physical model that simulates the plant 100. The model is used to predict characteristics of the plant 100. Numerical calculation data 5 obtained as a result of execution in the numerical calculation unit 400 is saved in the model constructing database 220.

Learning data 13, which is saved in the learning information database 230, is generated by the operation signal learning unit 700. Another type of learning data 13 saved in the learning information database 230 is generated in the evaluation function adjusting unit 900, which forms a main characteristic of the present invention. A model operation signal 10 generated by the operation signal learning unit 700 is input to the operation signal generation unit 600, where the signal is added to the current amount of model operation to generate a model input 7, which is then input to the model 500.

The model 500 has features to simulate control characteristics of the plant 100. That is, the model 500 performs simulated calculation equivalent to an operation to supply the operation signal 16, which becomes a control command, to the plant 100 and obtain the measurement signal data 1 as the result of the operation. To perform this simulated calculation, the model 500 is structured so that it receives the model input 7, which is equivalent to the operation signal 16, from the operation signal generation unit 600, uses model constructing data 6 to be saved in the model constructing database 220 to perform simulated calculation for a characteristic change due to control of the plant 100 by a statistic technique such as a neural network technique, and obtains a model output 8. The model output 8 is a value predicted for the measurement signal data 1 from the plant 100. The number of model inputs and the number of model outputs are not limited to 1; a plurality of model inputs and a plurality of model outputs can be used.

The operation signal generation unit 600 uses learning data 12 output from the learning information database 230 and control logic data 14 to be saved in the control logic database 240 to generate the operation signal 15 so that the measurement signal data 1 attains its control target value. A control circuit to calculate the control logic data 14 and control parameters are saved in the control logic database 240. PI control, which is known as prior art, can be used for the control circuit to calculate the control logic data 14.

The operation signal learning unit 700 uses learning restraining conditions to be saved in the learning information database 230, the learning data 12 including the target value for model output control and the like, and an evaluation function value 9, which is an evaluation value for the result of the model operation during learning to learn a method of operating the model input 7. That is, the operation signal learning unit 700 learns increases and decreases in the current amount of operation for the model input 7 and the like. The learning restraining conditions include learning conditions and constraints that have been set in advance.

The evaluation function calculating unit 800 calculates the evaluation function value 9 from the model output 8, which is obtained as a result of an operation performed by the operation signal learning unit 700 for the model 500 and an evaluation function parameter value 11 output from the evaluation function adjusting unit 900, and outputs the evaluation function value 9 to the operation signal learning unit 700 and evaluation function adjusting unit 900.

The evaluation function adjusting unit 900 receives the measurement signal data 3 obtained as a result of the actual operation of the plant 100 and the model output 8 equivalent to its predicted value. The evaluation function adjusting unit 900 also receives the evaluation function value 9 as well as the learning data 12 saved in the learning information database 230, which includes condition settings and previous parameter adjustment records used for parameter adjustment, to determine the evaluation function parameter value 11 and output the determined value to the evaluation function calculating unit 800. At the same time, the evaluation function adjusting unit 900 saves the learning data 13, which includes a parameter adjustment record used for learning and plant measurement signal data at that time, in the learning information database 230.

As described above, a mechanism for adaptively adjusting the evaluation function 9 during operation method learning by using a model output obtained during learning, an evaluation function value, and the previous parameter adjustment record is provided. This mechanism can be used to autonomously set an appropriate evaluation function even when the model characteristics are changed due to aging of the plant or a change in operation conditions, enabling a desired operation method to be learnt without a human burden.

The features of the operation signal learning unit 700, evaluation function calculating unit 800, and evaluation function adjusting unit 900 will be described below in detail. The learning data 13 saved from the operation signal learning unit 700 to the learning information database 230 includes model inputs before and after an operation and information about a model output obtained as a result of the operation. The learning data 12 corresponding to the current model input information is selected in the learning information database 230 and supplied to the operation signal generation unit 600.

The operator of the plant 100 can access information saved in the various types of databases provided in the control system 200 by using an external input unit 910 comprising a keyboard 911 and a mouse 912, a maintenance tool 920 having a data send/receive part 922 operable to send and receive data to and from the control system 200, and a display 930. The operator can also use these units to input setting parameters used in the numerical calculation unit 400, operation signal learning unit 700, and evaluation function adjusting unit 900.

The maintenance tool 920 comprises an outside input interface 921, the data send/receive part 922, and an outside output interface 923.

A maintenance tool input signal 91 generated in the external input unit 910 is fetched in the maintenance tool 920 through the outside input interface 921. The data send/receive part 922 in the maintenance tool 920 obtains input/output data 90 supplied from the control system 200, according to information in a maintenance tool input signal 92. The data send/receive part 922 outputs the input/output data 90 including parameter settings used in the numerical calculation unit 400, operation signal learning unit 700, and evaluation function adjusting unit 900, according to information in the maintenance tool input signal 92.

The data send/receive part 922 processes the input/output data 90 and sends a resulting maintenance tool signal 93 to the outside output interface 923. A maintenance tool signal 94 output from the outside output interface 923 is displayed on the display 930.

Although the control system 200 in the present invention internally includes the measurement signal data database 210, model constructing database 220, learning information database 230, control logic database 240, and operation signal database 250, all or part of these may be disposed outside the control system 200.

The numerical calculation unit 400 internally included in the control system 200 may be disposed outside the control system 200.

For example, the numerical calculation unit 400 and model constructing database 220 may be disposed outside the control system 200 and the numerical calculation data 5 may be sent to the control system 200 through the Internet.

Figure 2:
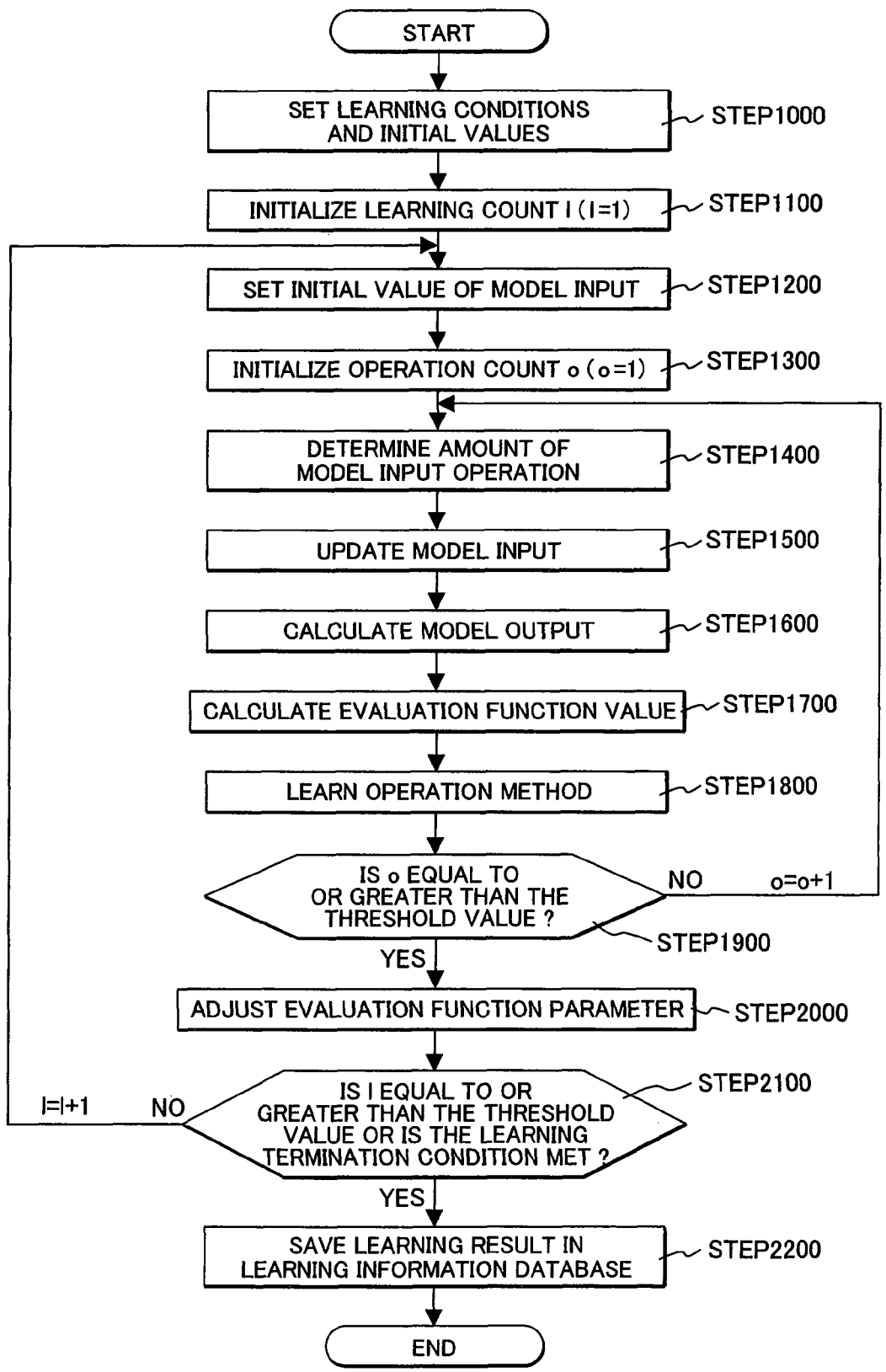
FIG. 2 is an operational flowchart for learning an operation method in the plant control system in the first embodiment of the present invention.

FIG. 2 is an operational flowchart for learning the operation method in the first embodiment that has been described. The flowchart in FIG. 2 is executed by combining steps 1000, 1100, 1200, 1300, 1400, 1500, 1600, 1700, 1800, 1900, 2000, 2100, and 2200. These steps will be described below.

After the operation signal learning unit 700 has started an operation, various parameter values are set in step 1000, which include the maximum learning count during learning, the maximum operation count, a target value for control of the model output 8, weight coefficients of the model outputs used in evaluation function calculation, the initial values of evaluation function parameters, and learning ratios of evaluation function parameters.

In step 1100, learning count l, indicating a value by which a loop between steps 1200 and 2100 is repeated, is initialized (l is set to 1). In step 1200, the initial value of the model input used at the start of learning is set. An arbitrary value can be selected as the initial value of the model input. In step 1300, operation count o, indicating a value by which a loop between 1400 and 1900 is repeated, is initialized (o is set to 1).

In step 1400, the operation signal learning unit is operated to determine the amount of model input operation. In step 1500, the determined amount of the model input operation is used to update the model input. In step 1600, the updated model input is sent to the model 500, where the model output 8, which is a result of a model calculation on the model input 7, is obtained.

In step 1700, the calculated model output value and the evaluation function parameter value 11 determined by the evaluation function adjusting unit 900 are used to operate the evaluation function calculating unit 800 to have it calculate the evaluation function value 9 on the model operation result and output the calculated value to the operation signal learning unit 700.

In step 1800, a model input operation method is learnt on the basis of the calculated evaluation function value by using various algorithms such as a reinforcement learning theory and neural network.

In step 1900, a decision is made; if operation count o is smaller than the maximum operation count set in step 1000, o is incremented by one and the sequence returns to step 1400; if o has reached the maximum operation count, the sequence proceeds to step 2000.

In step 2000, the evaluation function adjusting unit 900 is operated according to measurement signal data obtained as a result of the last operation, the model output information obtained as a result of learning the operation method, and the evaluation function value so as to adjust the evaluation function parameter. The evaluation function parameter adjustment will be described below in detail.

In step 2100, a decision is made; if learning count l is smaller than the maximum learning count set in step 1000 or a learning termination condition is not met, l is incremented by one and the sequence returns to step 1200; if l has reached the maximum learning count or the termination condition is met, the sequence proceeds to step 2200. The learning termination condition is met when a signal for forcibly terminating the learning is input from the maintenance tool 920 to the plant 100.

In step 2200, the learning result of the operation method and the adjustment result of the evaluation function parameter are saved in the learning information database 230, and the sequence proceeds to a step to terminate the operation for operation method learning.

Through these operations, an operation method for reaching from an arbitrary model input condition to a target value for a model output can be autonomously obtained in operation method learning, according to the learning condition set by the operator of the plant 100 and the adjustment condition of the evaluation function.

Figure 3:
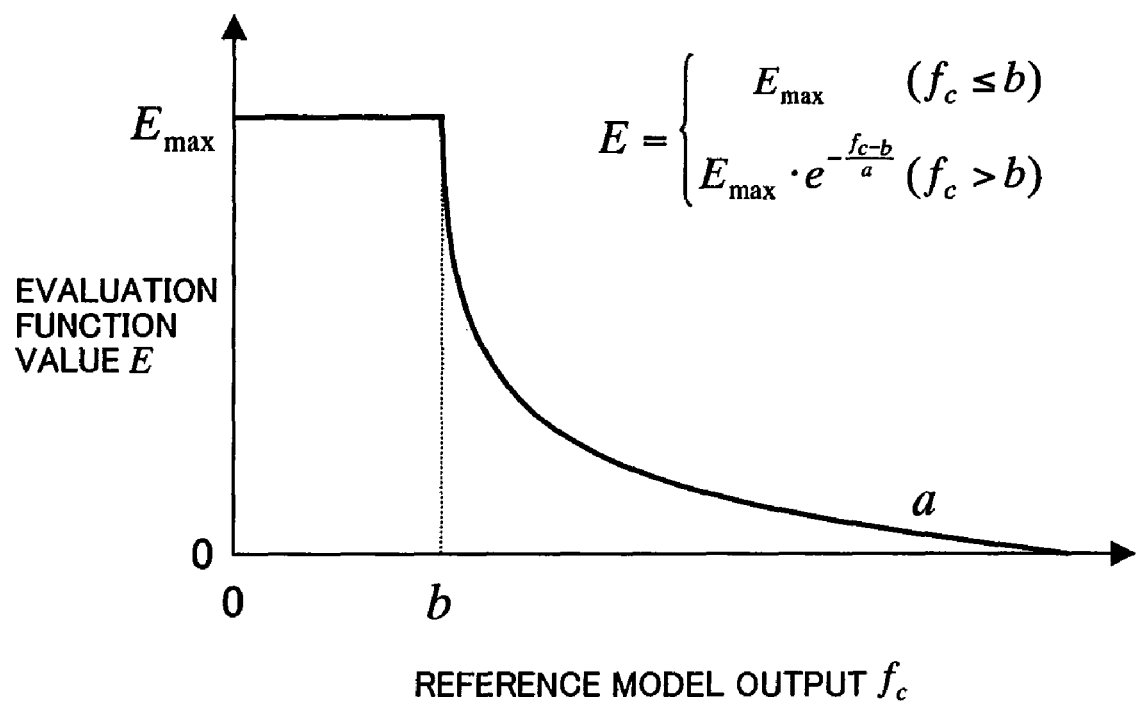
FIG. 3 shows an exemplary rough sketch of an evaluation function in the plant control system in the first embodiment of the present invention.

The function having a rough sketch shown in FIG. 3 can be used as an example of the evaluation function used in the evaluation function calculating unit 800. In FIG. 3, evaluation function value E is given by equation (1).

$$E = \begin{cases} E_{max} & (f_c \le b) \\ E_{max} \cdot e^{-\frac{f_c-b}{a}} & (f_c > b). \end{cases} \quad \text{[Equation 1]}$$

As seen from FIG. 3 and equation (1), evaluation function value E is a function of reference model output $f_c$. Its rough sketch is determined by parameters a, b, and $E_{max}$. That is, the smaller the reference model output $f_c$ is, the larger the evaluation function value E is; in addition, the evaluation function value E takes an optimum (maximum) value when $f_c$ is equal to or smaller than b. In this case, the smaller the reference model output is, the more desirable the evaluation function value E is. However, the opposite case can be handled by enabling the evaluation function value to take a larger value as the model output is increased. Although, in the above case, the maximum value of the evaluation function value is the optimum value, it is possible to take the minimum value as the optimum value.

The reference model output is derived from equation (2) by using model output $f_i$ (subscript i identifies a model output) employed by the operation signal learning unit 700 to learn an operation method.

$$f_c = \Sigma C_i f_{il} \quad \text{[Equation (2)]}$$

As seen from equation (2), reference model output $f_c$ is derived from the weighted sum of the model output $f_i$ obtained as a result of an operation during learning. In equation (2), $C_i$ is the weight coefficient of model output i and I is a set of the subscripts of the model outputs. When the operation method is learnt, the model output obtained as a result of the last operation is used as model output $f_i$. When the evaluation function parameter is adjusted, $f_i$ can be derived by using at least one of the following three methods.

(1) Using the model output value obtained in the last learning.

(2) Using an average of the model output values obtained from the last learning to a learning a certain period of time before the last learning.

(3) Using an optimum model output obtained up to the last learning.

Parameter a in FIG. 3 and equation (1) determine an expected value of the evaluation function value. As the value of the parameter becomes larger, the expected value of the evaluation function value for the reference model output is increased. Parameter b determines a threshold value of the reference model, the threshold value being used for the evaluation function value to take the optimum value $E_{max}$. When the reference model output takes a value smaller than the threshold value, the evaluation function value becomes the optimum value $E_{max}$. When the operation signal learning unit 700 carries out learning so that the evaluation function value is maximized, the operation signal learning unit 700 can obtain an operation method by which the model output is minimized. That is, the value of parameter b should match the minimum value of the display output.

Figure 4A:
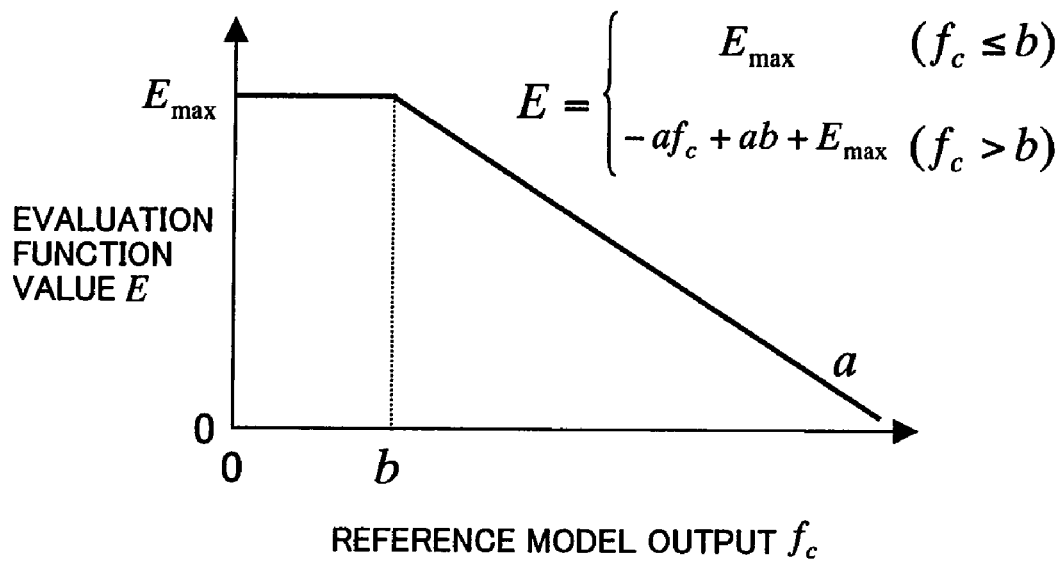
FIGS. 4A and 4B show other exemplary rough sketches of evaluation functions in the plant control system in the first embodiment of the present invention.
Figure 4B:
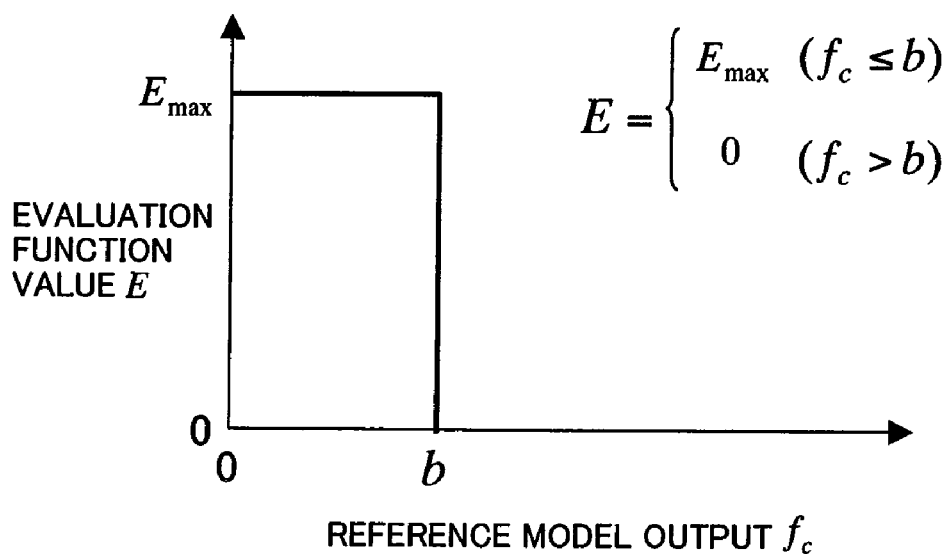

An evaluation function other than shown in FIG. 3 and equation (1) can be used. For example, evaluation functions having a rough sketch shown in FIGS. 4A and 4B may be used. In FIG. 4A, a linear function is used to represent the ease with which an evaluation function value is obtained. In FIG. 4B, when the reference model output is equal to or smaller than the value of parameter b, the evaluation function takes the optimum value $E_{max}$, and when the reference model output is larger than the value of parameter b, the value of the evaluation function is 0. The evaluation functions in FIGS.

4A and 4B assume that the evaluation function value becomes larger as the reference model output is reduced.

Figure 5:
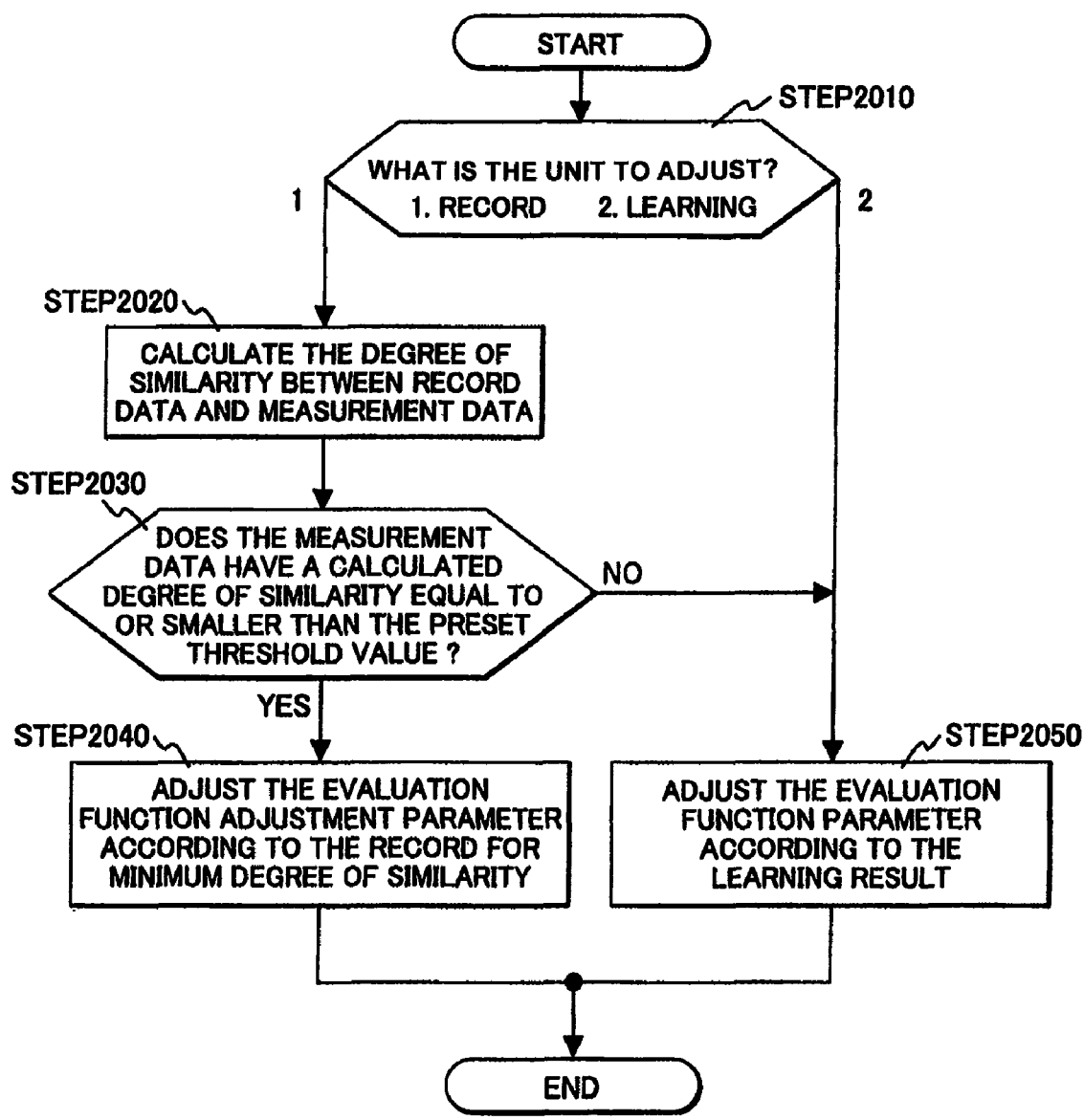
FIG. 5 is an operational flowchart for adjusting an evaluation function in the plant control system in the first embodiment of the present invention.

The operation in step 2000 in FIG. 2 will be described in detail with reference to the flowchart in FIG. 5, which illustrates operation in the adjustment algorithm of the evaluation function parameter in step 2000. As shown in FIG. 5, the operational flowchart of the adjustment algorithm of the evaluation function is executed by combining steps 2010, 2020, 2030, 2040, and 2050. These steps will be described below.

In step 2010, a decision is made; a unit to adjust the evaluation function parameter is determined by selecting one of two units, (1) adjustment according to a previous parameter adjustment record and (2) adjustment according to a learning result. When (1) is used as the adjustment unit, the sequence proceeds to step 2020; when (2) is used, the sequence proceeds to step 2050.

In step 2020, a degree of similarity between a previous evaluation function parameter adjustment record saved in the learning information database 230 and measurement data obtained as a result of the last plant operation is calculated. FIG. 6 illustrates an example of previous measurement data saved in the learning information database 230 and data representing an evaluation function parameter adjustment record corresponding to the measurement data. As shown in FIG. 6, measurement data mjk and corresponding parameter adjustment records ajk and bjk are saved in the learning information database 230, measurement data mjk representing an operation condition in a previous evaluation function parameter adjustment. Subscript j identifies previous measurement data and an adjustment record, subscript k identifies a measurement data item, and subscript l indicates a learning count. Sj in FIG. 6 are reference characters identifying a combination of a series of measurement data and a parameter adjustment record.

The degree of similarity is calculated according to equation (3).

$$sim_j = \sqrt{\sum_{k \in K} (m_{jk} - \theta_k)^2} \quad \text{[Equation (3)]}$$

As indicated by equation (3), similarity of degree $sim_j$ is defined by a Euclidean distance between previous measurement data mjk and measurement data $\theta_k$ obtained as a result of the last plant operation. K is a set of subscript k.

The smaller degree of similarity $sim_j$ is, the more similar to the previous measurement data mjk measurement data $\theta_k$ is. That is, the current plant operation state can be regarded to be close to the operation state at a time when measurement data mjk was obtained. A standardized value can also be used as the measurement data used in equation (3) instead of using the value of the measurement data without alteration. In distance calculation, not only the Euclidean distance but also distances obtained in other distance calculation methods such as the Ward distance, the Mahalanobis distance, and the Manhattan distance can be used.

In step 2030, a decision is made; if there is measurement data that has a calculated degree of similarity equal to or smaller than a preset threshold value, the sequence proceeds to step 2040. If not, the sequence proceeds to step 2050.

In step 2040, minimized measurement data is selected within a range in which the degree of similarity is equal to or smaller than the threshold value, and the evaluation function adjustment parameter is adjusted according to the parameter adjustment record corresponding to the selected measurement data, after which the sequence proceeds to a step in which to terminate the operation in the evaluation function parameter adjustment algorithm. The parameter value determined by the adjustment is the current learning count in FIG. 6.

In step 2050, parameter adjustment based on the learning result is carried out according to a parameter adjustment algorithm, which will be described later, after which the sequence proceeds to a step in which to terminate the operation in the algorithm.

In the operations described above, an adjustment record, if used for evaluation function parameter adjustment, similar to the current operation condition is selected from parameter adjustment records used in previous learning, according to the degree of similarity of the measurement data. Accordingly, the calculation cost required for the adjustment can be saved by adjusting a parameter suitable to the operation condition. Another advantage is that the risk of unsuccessful learning can be avoided. When the operation state has not been experienced, the feature to adjust a parameter according to the learning result is used so that parameter adjustment appropriate for the model characteristics is carried out according to the model output information obtained during learning, enabling a desired operation method to be learnt.

Detailed operation of step 2050 in FIG. 5 will be described with reference to the flowchart in FIG. 7.

Figure 7:
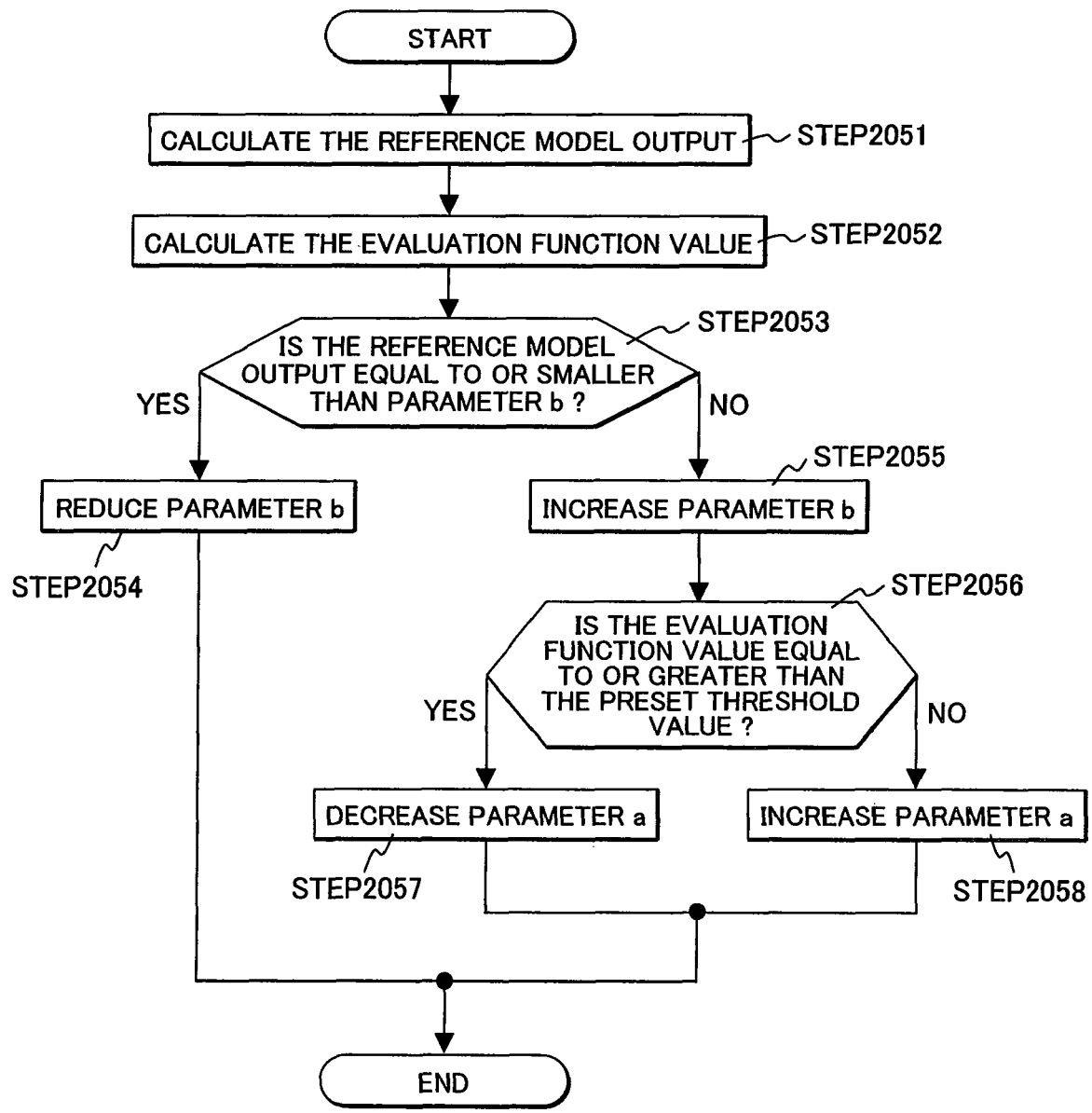
FIG. 7 is a flowchart for adjusting an evaluation function according to a learning result in the plant control system in the first embodiment of the present invention.

The flowchart in FIG. 7 illustrates operation in the evaluation function parameter adjustment algorithm used in step 2050, the algorithm being based on a learning result. As illustrated in FIG. 7, the operational flowchart of the evaluation function parameter adjustment algorithm is executed by combining steps 2051, 2052, 2053, 2054, 2055, 2056, 2057, and 2058. These steps will be described below.

In step 2051, the reference model output is calculated according to equation (2), as described above.

In step 2052, the calculated reference model output $f_c$ is assigned to equation (1) to calculate the evaluation function value E. In step 2053, a decision is made; if the calculated reference model output is equal to or smaller than the value of evaluation function parameter b, the sequence proceeds to step 2054; if not, the sequence proceeds to step 2055.

In step 2054, the value of parameter b is reduced according to equation (4), after which the sequence proceeds to a step in which to terminate the evaluation function parameter adjustment algorithm.

$$b \leftarrow b - \alpha_b |f_c - b| \quad \text{[Equation (4)]}$$

Where, $\alpha_b$ represents a learning ratio by which the amount of change of parameter b is determined, and the symbol | | represents an absolute value.

In step 2055, the value of parameter b is increased according to equation (5), after which the sequence proceeds to step 2056.

$$b \leftarrow b + \alpha_b |f_c - b| \quad \text{[Equation (5)]}$$

Parameter b is modified according to equations (4) and (5) so that its value is brought close to the reference model output obtained as a result of the learning. Specifically, the value of parameter b is large at an early stage of the learning during which the learning of the operation method is not adequately advanced because the reference model output is large; as the model output is reduced with the progress of the learning, the value of parameter b also reduces.

In step 2056, a decision is made; if the evaluation function value calculated in step 2052 is equal to or greater than a preset threshold value, the sequence proceeds to step 2057; if not, the sequence proceeds to step 2058.

In step 2057, the value of parameter a is reduced according to equation (6), after which the sequence proceeds to a step in which to terminate the evaluation function parameter adjustment algorithm.

$$a \leftarrow a - \alpha_a |a' - a| \quad \text{[Equation (6)]}$$

Where a' represents a change index for parameter a, and $\alpha_a$ represents a learning ratio by which the amount of change of parameter a is determined. The change index a' of parameter a can take an arbitrary value, but a' can be determined so that the evaluation function value in reference model output $f_c$ matches the threshold value $\delta$.

In step 2058, the value of parameter a is increased according to equation (7), after which the sequence proceeds to a step in which to terminate the evaluation function parameter adjustment algorithm.

$$\overline{a \leftarrow a + \alpha_a |a' - a|} \quad \text{[Equation (7)]}$$

Parameter a is changed according to equation (6) and (7) so that if reference model output $f_c$ is larger than the value of parameter b, the expected value (representing ease with which the evaluation function is obtained) is appropriately adjusted according to the obtained model output value. Specifically, if the obtained model output is near the value of parameter b, the value of parameter a is decreased (the spread of the evaluation function is narrowed); if the obtained model output is larger than the value of parameter b, the value of parameter a is increased (the spread of the evaluation function is enlarged). The ease with which an appropriate evaluation function according to the model characteristics is obtained can be represented by the above effect, increasing the efficiency of the learning.

In the above algorithm, the increasing and decreasing conditions may differ depending on whether the evaluation function equation and model output are improved by increasing or decreasing their values. In this case, when the parameters are adjusted according to the above basic concept so that an evaluation function can be obtained with ease at an early stage of the learning and it becomes difficult to obtain an evaluation function with the progress of the learning, the same effect as described above can be obtained.

Figure 8A:
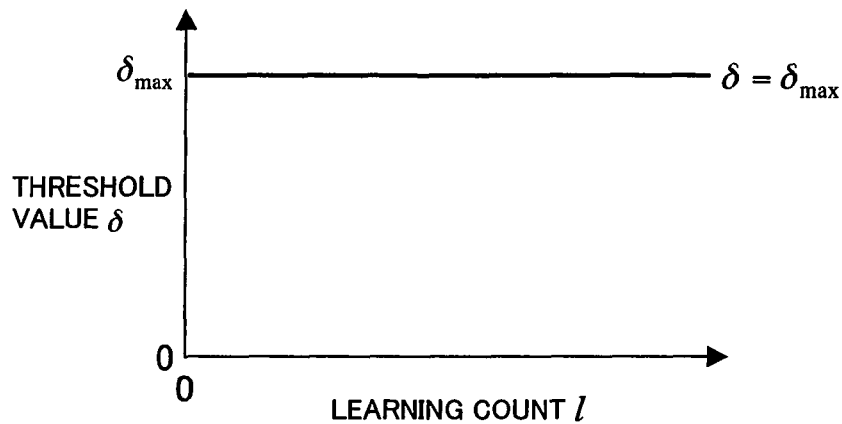
FIGS. 8A to 8C show characteristics of threshold value parameters in the plant control system in the first embodiment of the present invention.
Figure 8B:
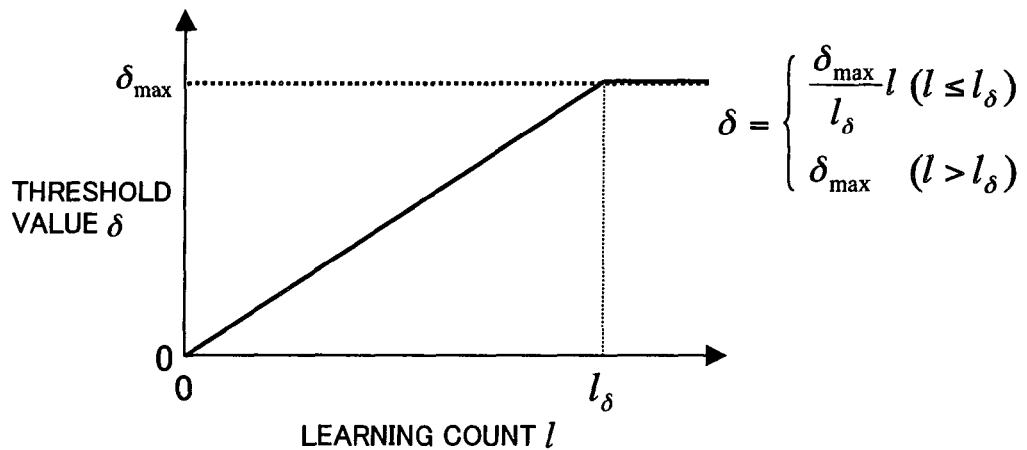
Figure 8C:
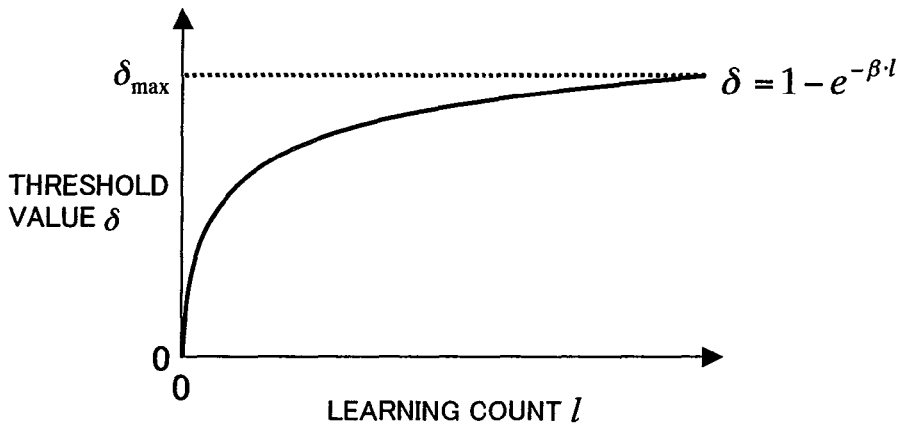

The threshold value $\delta$ for use in changing the value of parameter a can be derived by using at least one of the three equations shown in FIGS. 8A to 8C. In FIG. 8A, $\delta$ takes $\delta_{max}$ ($\delta = \delta_{max}$), which is an arbitrary value given through learning. In FIG. 8B, $\delta$ linearly changes with respect to learning count l according to equation (8), and becomes $\delta_{max}$ when the learning count reaches $l_\delta$. In the subsequent learning, $\delta$ remains unchanged. In FIG. 8C, $\delta$ non-linearly changes with respect to learning count l according to equation (9); $\delta$ converges so that it approaches $\delta_{max}$ as the learning proceeds. $\beta$ in equation (9) is a parameter for determining a rate at which $\delta$ converges. In FIGS. 8B and 8C, when the value of $\delta$ is increased as the learning count increases, if the evaluation function value is not adequately reduced at the early stage of the learning, an unpredictable increase in the value of parameter a can be suppressed. If the value of parameter a becomes too large, the evaluation function value is large even when the model output is large, so the learning may be adversely affected because of the inability to appropriately carry out evaluation. If the above situation occurs for this reason, the equation in FIG. 8B or 8C should be used to determine the value of $\delta$.

$$\delta = \begin{cases} \frac{\delta_{max}}{l_\delta} l & (l \le l_\delta) \\ \delta_{max} & (l > l_\delta) \end{cases} \quad \text{[Equation (8)]}$$

$$\delta = 1 - e^{-\beta l}. \quad \text{[Equation (9)]}$$

Figure 9:
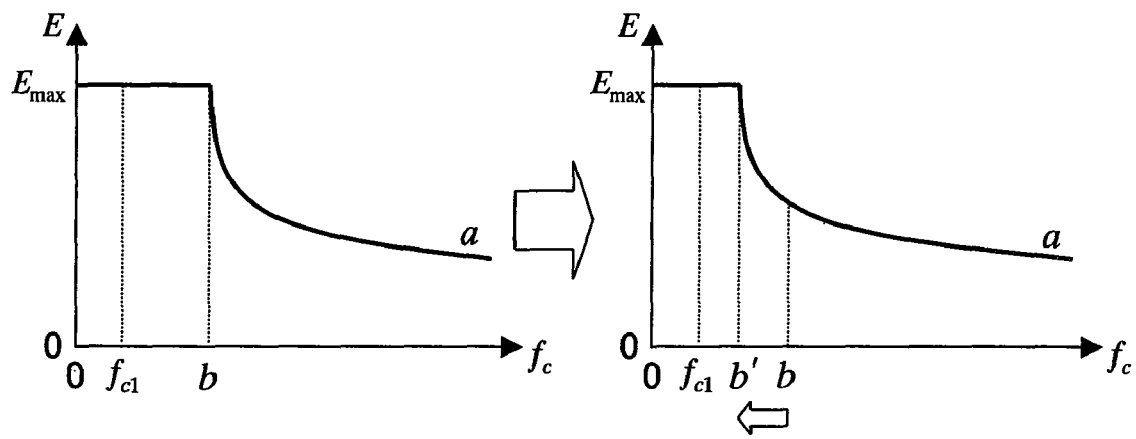
FIG. 9 illustrates an operation for adjusting an evaluation function in the plant control system in the first embodiment of the present invention.
Figure 9:
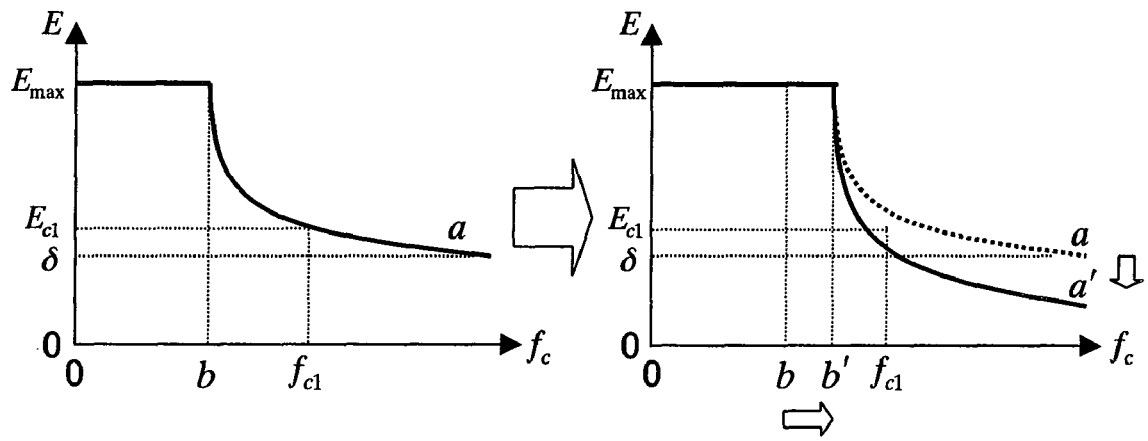
Figure 9:
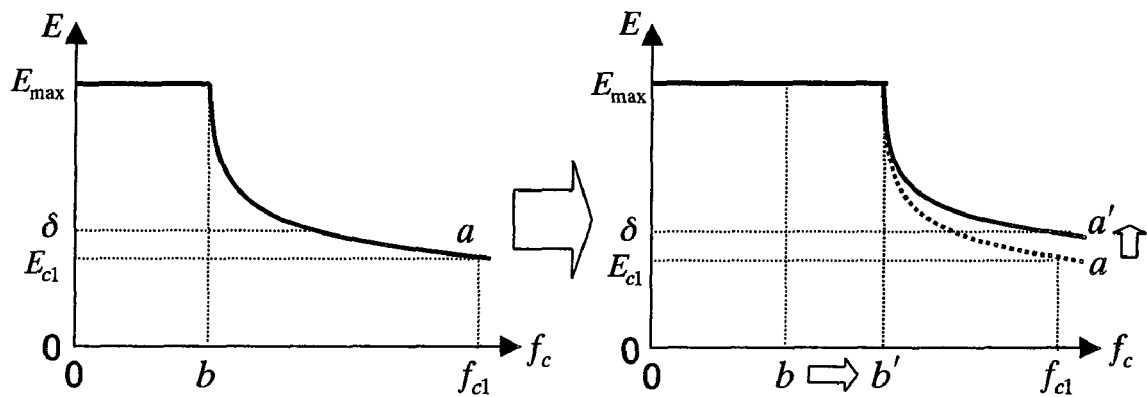

FIG. 9 illustrates an operation to adjust parameters a and b in the flowchart in FIG. 7. The graphs in 1) in FIG. 9 illustrate the operation in step 2054 in the flowchart in FIG. 7; the graphs show that when reference model output $f_{c1}$ is smaller than or equal to the value of parameter b, the value of parameter b is reduced toward $f_{c1}$. The graphs in 2) illustrate the operations in steps 2055 and 2057; when $f_{c1}$ is larger than the value of parameter b and evaluation function value $E_{c1}$ is larger than or equal to threshold value $\delta$, the value of parameter b is increased toward $f_{c1}$ and the value of parameter a is reduced toward the value of parameter a' (a'<a). The graphs in 3) illustrate the operations in steps 2055 and 2058; when $f_{c1}$ is larger than the value of parameter b and evaluation function value $E_{c1}$ is smaller than threshold value $\delta$, the value of parameter b is increased toward $f_{c1}$ and the value of parameter a is increased toward the value of parameter a' (a'>a).

When the evaluation function parameters a and b are adjusted during learning according to the above operations, evaluation functions appropriate for the progress of the learning are provided, making the learning efficient. Since the need to determine parameter values by trial and error is eliminated, the evaluation functions can be applied even to a case in which the model characteristics are unknown.

This completes the detailed description of the operations in step 2000 in FIG. 2 and step 2050 in FIG. 5.

Screens displayed on the display 930 will be described next with reference to FIGS. 10 to 12.

Figure 10:
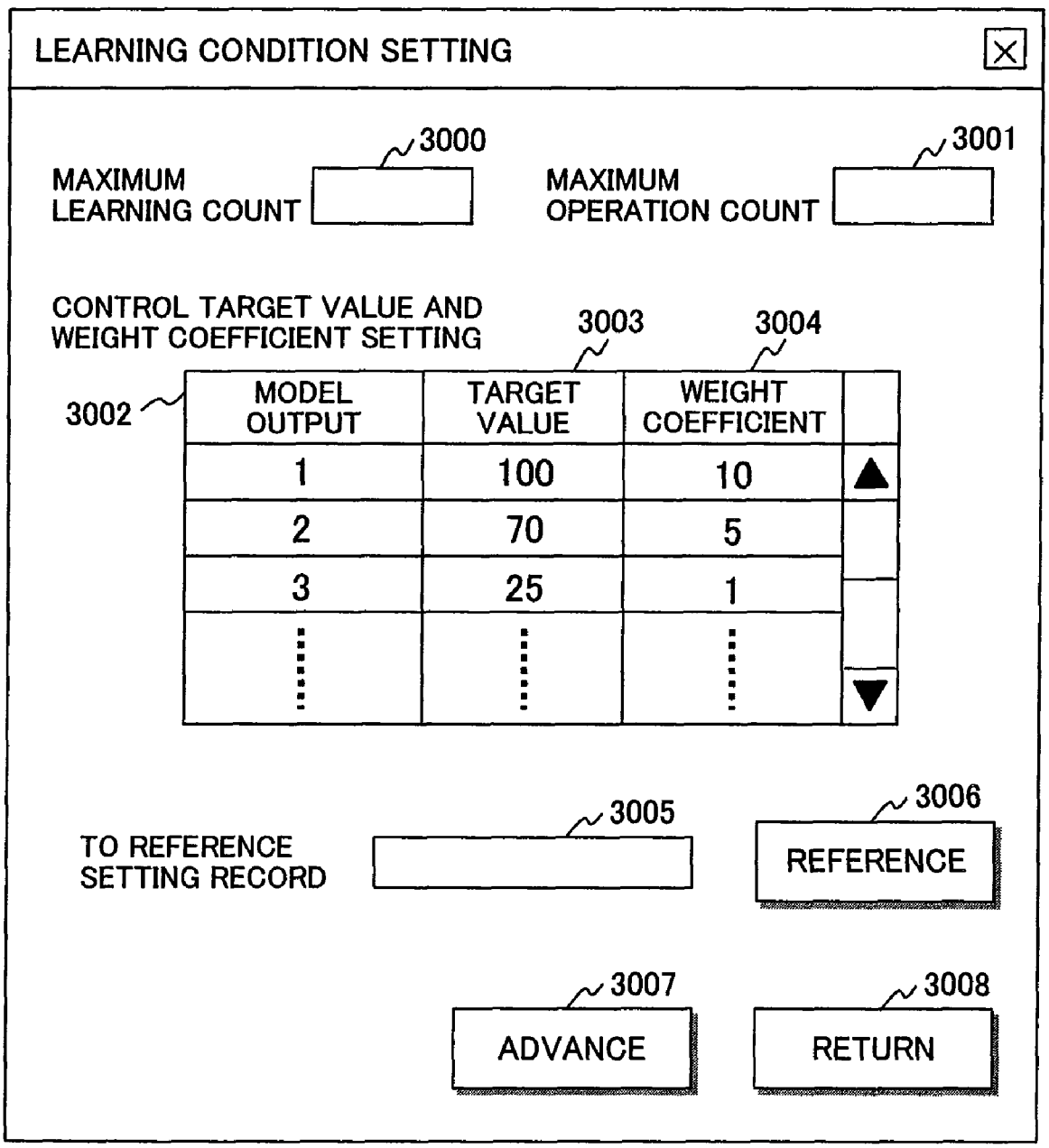
FIG. 10 shows an exemplary screen displayed on a display when learning is executed in the plant control system in the first embodiment of the present invention.
Figure 11:
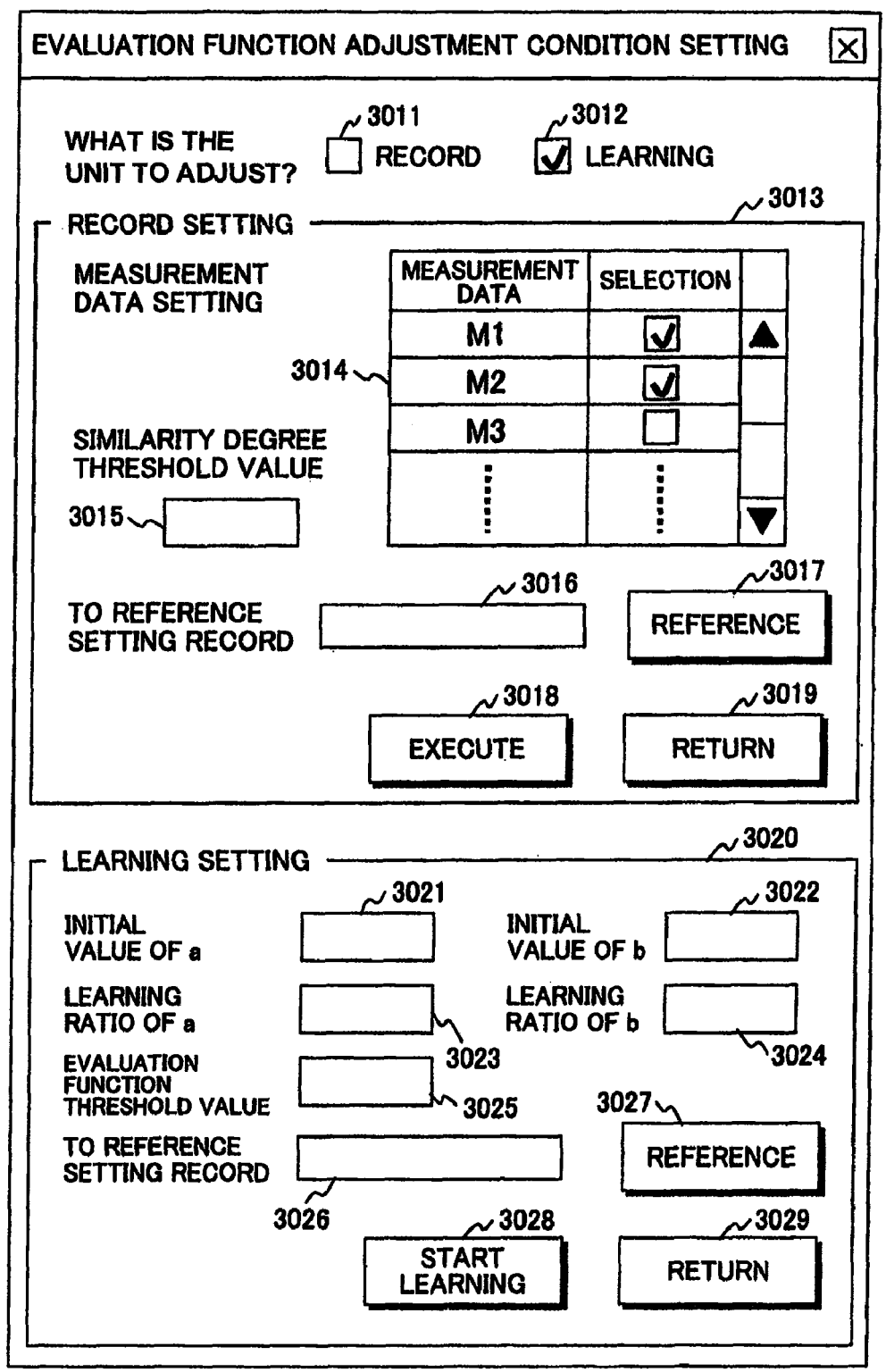
FIG. 11 shows an exemplary screen displayed on the display when an evaluation function is adjusted in the plant control system in the first embodiment of the present invention.
Figure 12:
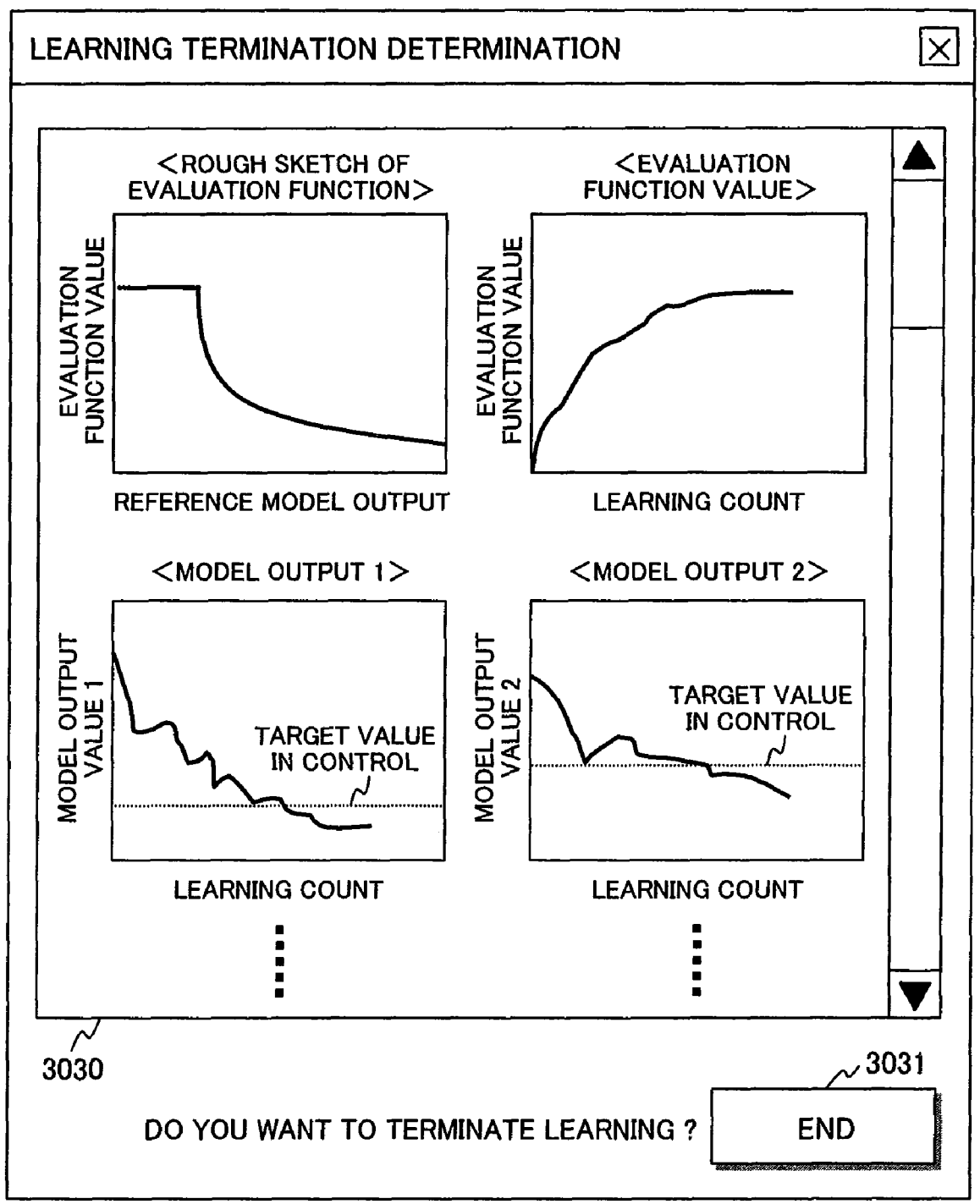
FIG. 12 shows an exemplary screen used to determine whether to terminate learning in the plant control system in the first embodiment of the present invention.

FIGS. 10 to 12 show exemplary screens displayed on the display 930. FIGS. 10 and 11 respectively show an exemplary learning condition setting screen and an exemplary evaluation function parameter adjustment setting screen, these screens being used in step 1000 in the flowchart in FIG. 2. When the screen in FIG. 10 is displayed on the display 930, numeric values can be entered in any numeric box on the screen by operating the mouse 912 to move the cursor to the numeric box and using the keyboard 911. A button on the screen can be selected by operating the mouse 912 to move the cursor to the button and clicking the mouse 912. When the mouse 912 is operated to move the cursor to a checkbox on the screen and then clicked in the same way, the checkbox is checked.

On the screen in FIG. 10, when the cursor is moved to the numeric box 3000 and a numeric value is entered, the entered value is determined as the maximum learning count, which is the threshold value of learning count 1 in the learning flowchart in FIG. 2. Similarly, when the cursor is moved to the numeric box 3001 and a numeric value is entered, the entered value is determined as the maximum operation count, which is the threshold value of operation count o.

In the control target value and weight coefficient setting table 3002, target values in model output control and weight coefficient $C_i$ used in reference model output $f_c$ calculation in equation (2) are entered. Specifically, in the table 3002, a target value and a weight coefficient can be respectively entered in a numeric box in the target value column 3003 and in a numeric box in the weight coefficient column 3004 for each model output. When a setting record used in previous learning is employed without alteration, the button 3005 is selected to display a setting record reference screen, after which data to be used is selected from a setting record data list and determined, displaying a record data name in the data box 3006. Settings described in relation to the record data name are automatically entered in the table 3002. The setting record data is saved in the learning information database 230.

When the button 3007 is selected after the above learning condition setting is completed, the evaluation function adjustment condition setting screen shown in FIG. 11 is displayed. When the button 3008 is selected, the initial screen is displayed again.

On the screen in FIG. 11, when the checkbox 3011 is selected, a unit to use a previous adjustment record is selected as the evaluation function parameter adjustment unit; when checkbox 3012 is selected, a unit to adjust based on a learning result is selected.

When adjustment based on a learning result is selected, the record setting field 3013 can be used to set measurement data used in similarity degree calculation and as a similarity degree threshold value. In the measurement data setting table 3014, a data item used in similarity degree calculation can be selected from measurement data items for the plant by checking the checkbox corresponding to the data item. A similarity degree threshold value can be entered into the numeric box 3015.

When a setting record used in previous learning is employed without alteration, the button 3017 is selected to display a setting record reference screen, after which data to be used is selected from a setting record data list and determined, displaying a record data name in the data box 3016. Settings described in relation to the record data name are automatically entered in the table 3014 and numeric box 3015.

When the button 3018 is selected after the above record setting is completed, learning can be started as indicated in the flowchart in FIG. 2. When the button 3019 is selected, the learning condition setting screen in FIG. 10 is displayed again.

When the checkbox 3012 is checked to select adjustment based on a learning result, adjustment conditions in the evaluation function adjustment algorithm in FIG. 7 can be set in the learning setting field 3020; the initial value of parameter a, the initial value of parameter b, the learning ratio of parameters a, the learning ratio of parameter b, and the evaluation function threshold value, which are all used in equations (4) to (7), can be input in the numeric boxes 3021, 3022, 3023, 3024, and 3025, respectively.

When a setting record used in previous learning is employed without alteration, the button 3027 is selected to display a setting record reference screen, after which data to be used is selected from a setting record data list and determined, displaying a record data name in the data box 3026. Settings described in relation to the record data name are automatically entered in the above numeric boxes.

When the button 3028 is selected after the above record setting is completed, learning can be started as indicated in the flowchart in FIG. 2. When the button 3029 is selected, the learning condition setting screen in FIG. 10 is displayed again.

FIG. 12 shows an exemplary screen used to determine whether to terminate learning in step 2100 in the flowchart shown in FIG. 2. The screen in FIG. 12 is displayed during a series of learning executions in steps 1200 to 2100 in the flowchart shown in FIG. 2. A rough sketch of the evaluation function during learning, the evaluation function value with respect to the learning count, and changes in the model output values are displayed in the learning result display field 3030 on the screen. The operator of the plant can determine whether the learning is adequately proceeding with reference to the learning results shown in the learning result display field 3030. Learning is determined to have converged when (1) the value of parameter b is not further reduced with respect to the rough sketch of the evaluation function, (2) the evaluation function value with respect to the learning count has been increased to near the maximum value and has converged, or (3) all mode output values with respect to the learning count have been reduced to or below the control target value and have converged.

When all or at least one of these conditions is met, the plant operator can terminate the learning by selecting the button 3031 even if the learning count has not reached the setting of the maximum learning count. This operation shortens the time conventionally assumed to be required for the learning. Accordingly, a higher control effect than before can be obtained by increasing the operation count.

This completes the description of the screens that appear on the display 930.

Second Embodiment

A second embodiment in which the inventive control system 200 is applied to a thermal power generation plant will be described. It will be appreciated that the control system 200 in the second embodiment in the present invention can also be used to control plants other than thermal power generation plants.

Figure 13:
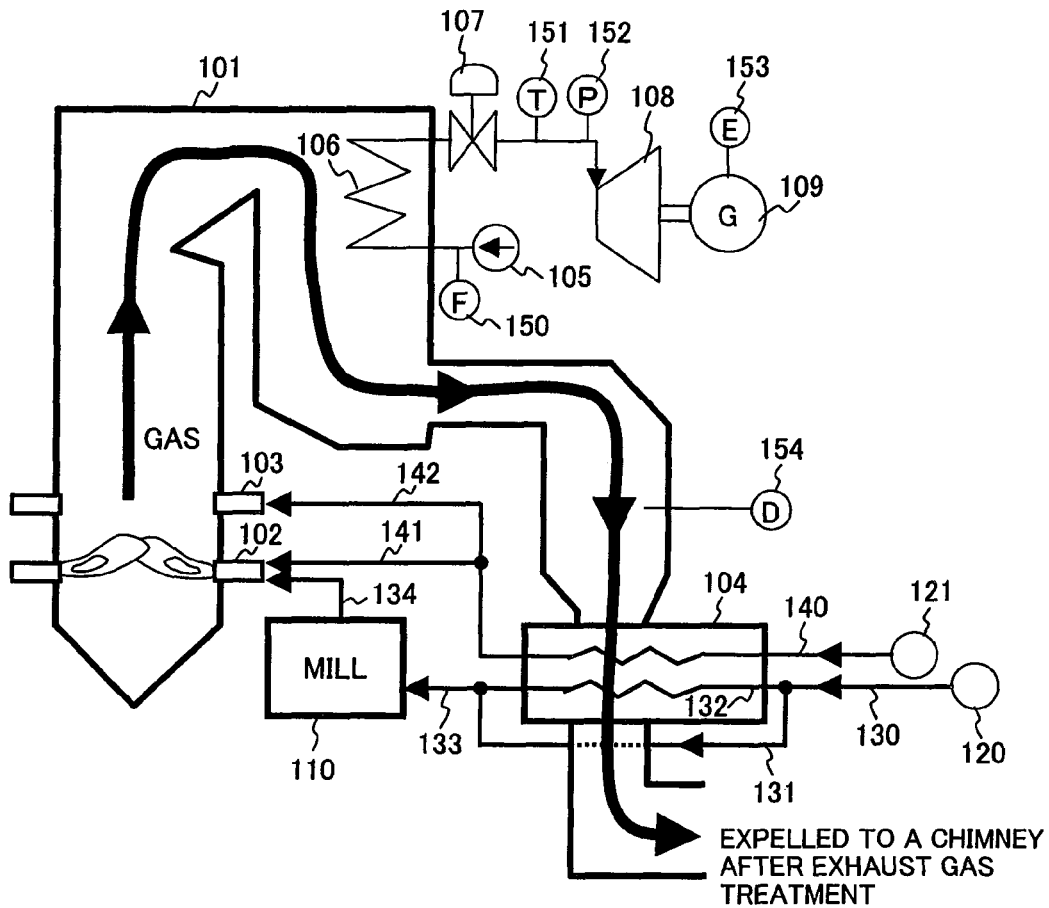
FIG. 13 is a block diagram illustrating the structure of a thermal power generation plant.

FIG. 13 schematically shows a thermal power generation plant. First, the mechanisms of power generation by the thermal power generation plant will be described.

The boiler 101, which is part of the thermal power generation plant, has a burner 102 through which to supply powdered coal, primary air for transferring the powdered coal, and secondary air for combustion adjustment, the powdered coal being formed by grinding coal in a mill 110 and being used as fuel. The powdered coal supplied through the burner 102 is burned in the boiler 101. The powdered coal and the primary air are supplied through a pipe 134 to the burner 102, and the secondary air is supplied through the pipe 141 to the burner 102.

The boiler 101 also has an after-air port 103 through which to supply air used for two-stage combustion to the boiler 101. The air is supplied through a pipe 142 to the after-air port 103.

A combustion gas generated at a high temperature from combustion flows toward the downstream side along an internal path in the boiler 101, passes through a heat exchanger 106 provided in the boiler 101 to perform heat exchange, and passes through an air heater 104. The gas, which has passed through the air heater 104, undergoes exhaust gas treatment and is expelled to the atmosphere through a chimney.

Feedwater circulating in the heat exchanger 106 in the boiler 101 is supplied to the heat exchanger 106 through a feedwater pump 105. The feedwater is heated, in the heat exchanger 106, by the combustion gas flowing toward the downstream side of the boiler 101, and converted into steam at a high temperature under a high pressure. Although, in the second embodiment, only one heat exchanger is used, a plurality of heat exchangers may be used.

After the high-temperature, high-pressure steam has passed through the heat exchanger 106, it is derived to a steam turbine 108 through a turbine governor 107, and drives the steam turbine 108 by the energy of the steam, causing a generator 109 to generate electric power.

Various types of instruments are provided in the thermal power generation plant to detect its operation state. In FIG. 13, for example, a flow rate measuring instrument 150, a temperature measuring instrument 151, a pressure measuring instrument 152, a generated power output measuring instrument 153, and a density measuring instrument 154 are provided. Measurement signal data for the plant is obtained from these instruments and sent to the control system 200 as the measurement signal data 1 in FIG. 1.

The flow rate measuring instrument 150 measures the flow rate of the feedwater supplied from the feedwater pump 105 to the boiler 101. The temperature measuring instrument 151 and pressure measuring instrument 152 respectively measure the temperature and pressure of the steam supplied from the heat exchanger 106 to the steam turbine 108.

The amount of electric power generated by the generator 109 is measured by the generated power output measuring instrument 153. Information about the concentrations of ingredients (nitrogen oxides NOx, carbon monoxide CO, hydrogen sulfide H₂S, and the like) included in the combustion gas passing through the boiler 101 can be measured by the density measuring instrument 154 disposed downstream of the boiler 101.

That is, when the control system 200 in the present invention is used in the above thermal power generation plant, the measurement data items in FIGS. 6 and 11 include the fuel flow rate, air flow rate, feedwater flow rate, steam temperature, gas temperature, feedwater pressure, and gas concentrations measured by the above measuring instruments.

In general, many measuring instruments other than those shown in FIG. 13 are disposed in a thermal power generation plant, but they are omitted in the drawing.

A path through which the primary air and secondary air are supplied from the burner 102 into the boiler 101 and an air path through which air is supplied from the after-air port 103 into the burner 102 will be described next.

The primary air is derived from a fan 120 to a pipe 130 and then branches into a pipe 132, which passes through the air heater 104 provided downstream of the boiler 101, and another pipe 131, which bypasses the air heater 104 without passing through it. The branched air flows are combined at a connection leading to a pipe 133 and derived to the mill 110 disposed upstream of the burner 102.

The primary air passing through the air heater 104 is heated by the combustion gas passing toward the downstream of the boiler 101. The primary air is passed through the pipe 134 together with powdered coal ground by the mill 110 to transfer the powdered coal to the burner 102.

Air supplied from a pipe 140 by a fan 121 is also heated by the air heater 104 as described above and then branches into the pipe 141 for supplying secondary air and the other pipe 142 connected to the after-air port 103. The branched air flows are derived to the burner 102 and after-air port 103.

Figure 14:
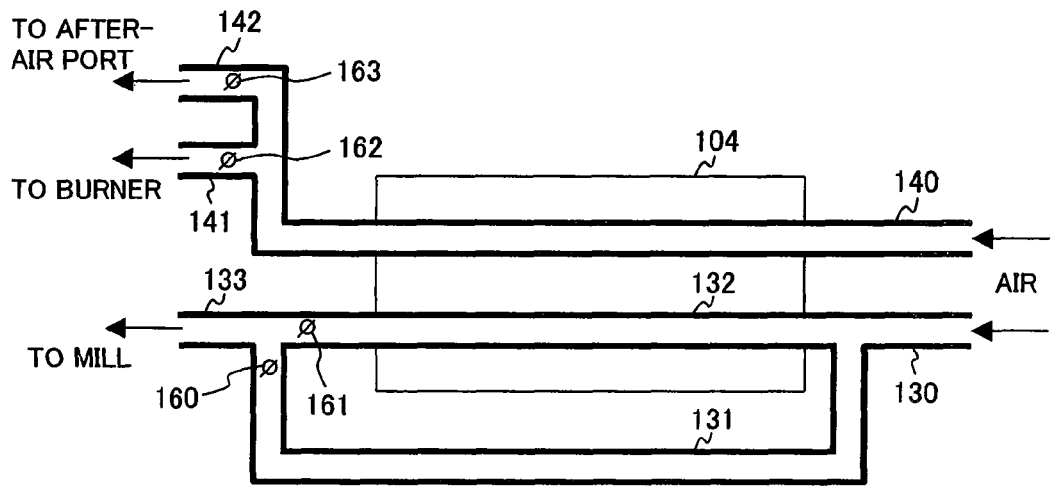
FIG. 14 is a magnified view around an air heater.

FIG. 14 is a magnified view of pipes around the air heater 104 of the thermal power generation plant shown in FIG. 13. As shown in FIG. 14, the pipes 131, 132, 141, and 142 are provided with air dampers 160, 161, 162, and 163, respectively. The areas of the pipes 131, 132, 141, and 142, through which air passes, can be changed by operating the air dampers 160, 161, 162, and 163. The air flow rates in these pipes can be individually adjusted.

The boiler 101 uses operation signal 16 generated by the control system 200 to operate the air dampers 160, 161, 162, and 163 and other devices. In the second embodiment, the air dampers 160, 161, 162, and 163 and other devices are referred to as operation ends, and command signals required to operate them are referred to as operation signals.

In the description that follows, when the control system 200 that embodies the present invention, is used for a thermal power generation plant, operations ends are burners before and after the boiler and the air damper for the after-air port, and the amounts controlled are concentration of CO, NOx, and H₂S emitted from the boiler. In the second embodiment, the amounts by which the operation ends are operated are model inputs, and the concentrations of CO, NOx, and H₂S are model outputs.

FIG. 15 shows an exemplary screen displayed on the display 930 when the control system that embodies the present invention is used in a thermal power generation plant. The screen corresponds to the screen in FIG. 10. Environmental restrictions are imposed on the amounts of exhaust gases, such as NOx and CO, emitted from thermal power generation plants. It is desirable that these thermal power generation plants be operated so that the restrictions are met. It is also desirable that in view of operation costs, NOx and H₂S are minimized to reduce costs in NOx reduction and prevent the boiler 101 from being corroded by H₂S. To satisfy these demands, two target values in control can be set for each of NOx, CO, and H₂S, the amounts of which are to be controlled, in FIG. 15; the two target values are (1) not greater than the reference value (control ensuring value) and (2) value as low as possible.

Specifically, in the control ensuring value/weight coefficient setting field 3042, one of the two target values can be selected by checking or unchecking the control ensuring checkboxes 3043. Control ensuring values are entered in the numeric box 3044 corresponding to the checked items. For the unchecked items, weight coefficients used in reference model output are entered in the corresponding numeric boxes 3045. When the field is set as shown in FIG. 15, the evaluation function is calculated according to equation (10).

$$E = \begin{cases} E_{max} & (f_{CO} \leq 100, f_c \leq b) \\ E_{max} \cdot e^{-\frac{f_c-b}{a}} & (f_{CO} \leq 100, f_c > b) \\ 0 & (f_{CO} > 100). \end{cases} \quad [\text{Equation (10)}]$$

Where, $f_{CO}$ indicates the CO concentration. That is, equation (10) calculates an evaluation function value according to equation (1) only when the CO concentration is equal to or smaller than the control ensuring value (100 ppm). In other cases, the evaluation function value is calculated as 0. When the evaluation function is calculated as described above, the operation signal learning unit 700 can learn an operation method by which the concentrations of NOx and H₂S are minimized while the CO concentration is equal to or smaller than the control ensuring value. The features of the numeric boxes 3040 and 3041, the data box 3046, and buttons 3047, 3048, and 3049 in FIG. 15 are the same as in FIG. 10.

When the above screens displayed on the display 930 are used, an operation method can be obtained by which demands for environmental restrictions on the concentrations of NOx, CO, and H₂S as well as operation costs are met.

What is claimed is:

1. A plant control system having
a measurement signal data database in which to save previous measurement signal data,
a model to estimate a value of measurement signal data used at a time when an operation signal is given to a plant,
an operation signal learning unit to learn a method of generating a model input, which is equivalent to an operation signal, so that a model output, which is equivalent to the measurement signal data, attains a target value in the model, an evaluation function calculating unit to calculate an evaluation function value, which indicates an attainment degree of the target value, from the model output obtained as a result of an operation carried out by the operation signal learning unit for the model, and a learning information database in which to save information about records of evaluation function values obtained by the operation signal learning unit and learning and information about model output learning records, the plant control system using the measurement signal data obtained from the plant to calculate the operation signal for operating the plant and sends the calculated operation signal to the plant, wherein the control system comprises an evaluation function adjusting unit to receive setting condition information used for evaluation function adjustment from the learning information database, adjusting at least two evaluation function parameters used for calculation of an evaluation function in the evaluation function calculating unit, and saving information about an adjustment result including an evaluation function parameter adjustment record, wherein the at least two evaluation function parameters include:

at least one of a parameter which determines the expected value of the evaluation function value to change within a predetermined range of the model output or a reference model output, which is a weighted sum of the plurality of model outputs, and a parameter used as a threshold value to obtain an optimum value of the evaluation function; and the evaluation function calculating unit has a feature to calculate the evaluation function value from the model output or the reference model output obtained as a result of an operation performed by the operation signal learning unit for the model.

2. The plant control system according to claim 1, wherein:
the evaluation function adjusting unit adjusts a parameter which determines an expected value of the evaluation function value according to the magnitude of the obtained evaluation function value, into the direction in which a more proper evaluation function value to the characteristic of the plant is obtained.

3. The plant control system according to claim 1, wherein the evaluation function adjusting unit has at least one of a feature to calculate a similarity of degree through a calculation of a distance between measurement signal data for a plant associated with a previous adjustment record of the evaluation function parameter and measurement signal data for the plant for which an operation method is learnt, a feature to adjust the evaluation function parameter according to an adjustment record by which a calculated similarity of degree equal to or smaller than a threshold value given in advance is minimized, and a feature to adjust the evaluation function parameter according to model output information obtained during learning and evaluation function value information.

4. The plant control system according to claim 1, wherein the evaluation function adjusting unit has at least one of a feature to increase or decrease the parameter value that determines an expected value of the evaluation function value during evaluation function parameter adjustment according to model output information obtained during learning and evaluation function value information, depending on whether an evaluation function value calculated from a reference model output is equal to or greater than a threshold value given in advance, and a feature to increase or decrease the parameter value depending on whether the reference model output is equal to or smaller than the parameter, which is a threshold value for obtaining an optimum value of the evaluation function.

5. The plant control system according to claim 1, wherein the evaluation function adjusting unit has at least one of a feature to set a threshold value to a value that is fixed through learning, a feature to linearly increase the threshold value as the learning proceeds, and a feature to non-linearly increase the threshold value as the learning proceeds, when the threshold value is determined, the threshold value being used to adjust the parameter value that determines an expected value of the evaluation function value.

6. The plant control system according to claim 1, further comprising at least one of a feature to display, on a screen, information saved in the measurement signal data database and information saved in the learning information database, a feature to set a learning condition used in the operation signal learning through a display feature, a feature to set an adjustment condition used in the evaluation function adjusting unit through the display feature, and a feature to display, on another screen, a rough sketch of the evaluation function and a record of learning results of model output values during operation method learning.

7. A thermal power generation plant control system having an operation signal generation part that uses measurement signal data obtained from a thermal power generation plant to derive a plurality of operation signals to be supplied to the thermal power generation plant, the control system comprising:

a measurement signal data database in which to save previous measurement signal data;

a model to estimate a value of measurement signal data used at a time when an operation signal is given to the thermal power generation plant;

an operation signal learning unit to learn a method of generating a model input, which is equivalent to an operation signal, so that a model output, which is equivalent to the measurement signal data, attains a target value in the model, the target value being set through a display;

an evaluation function calculating unit to calculate an evaluation function value, which indicates an attainment degree of the target value, from the model output, which indicates a result of an operation carried out by the operation signal learning unit for the model;

a learning information database in which to save information about a record of evaluation function values obtained by the operation signal learning unit and learning and information about a model output learning record; and an evaluation function adjusting unit to receive setting condition information used for evaluation function adjustment from the learning information database, to adjust at least two evaluation function parameters used for evaluation function calculation in the evaluation function calculating, and to save information about an adjustment result including an evaluation function parameter adjustment record;

wherein the measurement signal data includes at least one of concentrations of nitrogen oxide, carbon monoxide, and hydrogen sulfide included in a gas emitted from the thermal power generation plant; and wherein the plurality of operation signals determine at least one of an opening of an air damper, an air flow rate, a fuel flow rate, and an exhaust gas recycle flow rate, wherein the at least two evaluation function parameters include at least one of a parameter which determines the expected value of the evaluation function value to change within a predetermined range of the model output or a reference model output, which is a weighted sum of the plurality of model outputs, and a parameter used as a threshold value to obtain an optimum value of the evaluation function; and the evaluation function calculating unit has a feature to calculate the evaluation function value from the model output or the reference model output obtained as a result of an operation performed by the operation signal learning unit for the model.

8. The thermal power generation plant control system according to claim 7, wherein:

the evaluation function adjusting unit adjusts a parameter which determines an expected value of the evaluation function value according to the magnitude of the obtained evaluation function value, into the direction in which a more proper evaluation function value to the characteristic of the plant is obtained.

9. The thermal power generation plant control system according to claim 7, wherein the evaluation function adjusting unit has at least one of a feature to calculate a similarity of degree through a calculation of a distance between measurement signal data for a plant associated with a previous adjustment record of the evaluation function parameter and measurement signal data for the plant for which an operation method is learnt, a feature to adjust the evaluation function parameter according to an adjustment record by which a calculated similarity of degree equal to or smaller than a threshold value given in advance is minimized, and a feature to adjust the evaluation function parameter according to model output information obtained during learning and evaluation function value information.

10. The thermal power generation plant control system according to claim 7, wherein the evaluation function adjusting unit has at least one of a feature to increase or decrease the parameter value that determines an expected value of the evaluation function value during evaluation function parameter adjustment according to model output information obtained during learning and evaluation function value information, depending on whether an evaluation function value calculated from a reference model output is equal to or greater than a threshold value given in advance, and a feature to increase or decrease the parameter value depending on whether the reference model output is equal to or smaller than the parameter, which is a threshold value for obtaining an optimum value of the evaluation function.

11. The thermal power generation plant control system according to claim 7, wherein the evaluation function adjusting unit has at least one of a feature to set a threshold value to a value that is fixed through learning, a feature to linearly increase the threshold value as the learning proceeds, when the threshold value is determined, the threshold value being used to adjust the parameter value that determines an expected value of the evaluation function value.

12. The thermal power generation plant control system according to claim 7, further comprising at least one of a feature to display, on a screen, information saved in the measurement signal data database and information saved in the learning information database, a feature to set a learning condition used in the operation signal learning unit through a display feature, a feature to set an adjustment condition used in the evaluation function adjusting unit through the display feature, and a feature to display, on another screen, a rough sketch of the evaluation function and a record of learning results of model output values during operation method learning.

13. The thermal power generation plant control system according to claim 7, wherein the operation signal learning unit has an operation method by which an operation is ensured with values equal to or smaller than control-ensuring values for concentrations of nitrogen oxide, carbon monoxide, and hydrogen sulfide, and also includes a feature to learn at least one of operation methods by which a minimum value of the model is obtained.

14. The thermal power generation plant control system according to claim 11, wherein a setting condition related to a learning feature for a method of adjusting the parameter value through a display.

* * * * *